(12) United States Patent
Keitz et al.

(10) Patent No.: US 9,747,591 B2
(45) Date of Patent: Aug. 29, 2017

(54) ONLINE STOCK PAYMENT SYSTEM

(71) Applicant: The Keitz Group LLC, Jenkintown, PA (US)

(72) Inventors: Todd J. Keitz, Jenkintown, PA (US); Neal H. Keitz, Boynton Beach, FL (US); Michael L. Keitz, Dresher, PA (US); Andrew Brecher, Lower Gwynedd, PA (US); Nancy Gussow Gross, Dresher, PA (US); Craig E. Conway, Bryn Mawr, PA (US); Edward L. Blume, Merion Station, PA (US); Jerry Steinbrink, Doylestown, PA (US); Stuart L. Anmuth, Philadelphia, PA (US)

(73) Assignee: The Keitz Group, LLC, Jenkintown, PA (US)

( * ) Notice: Subject to any disclaimer, the term of this patent is extended or adjusted under 35 U.S.C. 154(b) by 0 days.

(21) Appl. No.: 13/960,633

(22) Filed: Aug. 6, 2013

(65) Prior Publication Data

US 2014/0040100 A1   Feb. 6, 2014

Related U.S. Application Data

(60) Provisional application No. 61/680,032, filed on Aug. 6, 2012.

(51) Int. Cl.
  *G06Q 20/12* (2012.01)
  *G06Q 20/02* (2012.01)
  *G06Q 40/04* (2012.01)
(52) U.S. Cl.
  CPC ............ *G06Q 20/12* (2013.01); *G06Q 20/02* (2013.01); *G06Q 40/04* (2013.01)

(58) Field of Classification Search
  None
  See application file for complete search history.

(56) References Cited

U.S. PATENT DOCUMENTS 6,058,378 A * 5/2000 Clark et al. .................. 705/37
7,089,208 B1   8/2006 Levchin et al.
(Continued)

FOREIGN PATENT DOCUMENTS

KR   1020030028344 A   4/2003
KR   1020100089800 A   8/2010

OTHER PUBLICATIONS

Definitions of Securities: 1. Dictionary of Business Terms, Third Edition, Barron's Educational Series, 2000., p. 616. Black's Law Dictionary (9th ed. 2009); 3. The Free Dictionary by Farlex (no date); 4. Dictionary of Financial Terms 2.*

(Continued)

*Primary Examiner* — Robert R Niquette
*Assistant Examiner* — Joseph W King
(74) *Attorney, Agent, or Firm* — IPVillage; Kevin M. Drucker, Esq.; David L. Cargille, Esq.

(57) ABSTRACT

In general, this disclosure describes an electronic payment processing system that facilitates payment for goods or services using securities, such as stock. In some examples, a computing device includes at least one processor configured to receive data indicating an electronic payment request for a transaction associated with a provider of goods or services; process the payment request with a payment processing system to access a data store of a data storage device to identify one or more accounts associated with a recipient of the goods or services and to determine whether the identified accounts have sufficient amount of securities to satisfy an amount specified by the electronic payment request; and when the identified account has a sufficient amount of securities to satisfy the amount specified by the (Continued)

payment request, automatically generating an electronic response message from the payment processing system indicating pending payment for the transaction.

22 Claims, 16 Drawing Sheets

(56) References Cited

U.S. PATENT DOCUMENTS

| | | | |
|---|---|---|---|
| 7,103,576 | B2 | 9/2006 | Mann, III et al. |
| 7,117,171 | B1 | 10/2006 | Pollin |
| 7,644,037 | B1* | 1/2010 | Ostrovsky ................. 705/40 |
| 7,742,985 | B1 | 6/2010 | Digrigoli et al. |
| 7,756,764 | B1* | 7/2010 | Horne et al. ................. 705/35 |
| 8,055,582 | B2 | 11/2011 | Digrigoli et al. |
| 8,135,634 | B2 | 3/2012 | Abeles |
| 2001/0037275 | A1 | 11/2001 | Johnson et al. |
| 2001/0037284 | A1* | 11/2001 | Finkelstein et al. .......... 705/37 |
| 2002/0116331 | A1* | 8/2002 | Cataline et al. ............. 705/39 |
| 2003/0046219 | A1* | 3/2003 | Rosedale et al. ............ 705/37 |
| 2003/0050879 | A1* | 3/2003 | Rosen et al. ................. 705/35 |
| 2004/0006529 | A1* | 1/2004 | Fung ........................... 705/37 |
| 2005/0021353 | A1 | 1/2005 | Aviles et al. |
| 2006/0080194 | A1* | 4/2006 | Rachie ................. G06Q 40/00 705/35 |
| 2006/0184437 | A1* | 8/2006 | Bruetting et al. ............. 705/35 |
| 2007/0055623 | A1 | 3/2007 | Ha et al. |
| 2008/0319873 | A1 | 12/2008 | Levchin et al. |
| 2008/0319875 | A1 | 12/2008 | Levchin et al. |
| 2008/0319899 | A1 | 12/2008 | Levchin et al. |
| 2010/0191587 | A1* | 7/2010 | Duerr .......................... 705/14.7 |
| 2011/0078043 | A1 | 3/2011 | Ra |
| 2012/0054104 | A1 | 3/2012 | Templeton et al. |
| 2012/0066131 | A1 | 3/2012 | Modi |
| 2012/0278210 | A1* | 11/2012 | Delshad ....................... 705/30 |

OTHER PUBLICATIONS

International Search Report and the Written Opinion of the International Searching Authority mailed Nov. 21, 2013 in corresponding PCT Application PCT/US2013/053849, 13 pgs.
Klozotsky, Michael "How a (Non-Apple) U.S. Patent Might Just Change the World", Forbes, Jul. 31, 2012, available at http://www.forbes.com/sites/insidearm/2012/07/31/how-a-non-apple-u-s-patent-might-just-change-the-world/, 4 pgs.
"How It Works", Stock Donator, http://www.stockdonator.com, accessed Jun. 22, 2012, 2 pgs.

* cited by examiner

600

- Home
- Aggregation set up

Please make your selection below

| ∨ | Choose Your Brokerage Firm From the List Below | Use your Stock for good, give generously and easily to all the charities you support while getting a tax benefit by eliminating the capital gain on your stocks with long term profits |
|---|---|---|
| | ☒ Brokerage Firm 1 ← 604 | |
| | ☐ Brokerage Firm 2 | |
| | ☐ Brokerage Firm 3 | |
| | ☐ Brokerage Firm 4 | |

Please make your selection below
_____

702 → | v | Brokerage Firm 1 | ← 704
        | ENTER USER NAME | ← 706

Please make your selection below
_____

712 → | v | Brokerage Firm 1 | ← 714
        | JoeSmith22 | ← 716

Please make your selection below
_____

| DONATE | ← 722
| PAY | ← 724

FIG. 7C

ONLINE STOCK PAYMENT SYSTEM

This application claims the benefit of U.S. Provisional Application No. 61/680,032, filed Aug. 6, 2012, the entire content of which is incorporated by reference herein.

TECHNICAL FIELD

The disclosure relates to computer networks and, more specifically, to electronic systems for processing payment for goods or services.

BACKGROUND

A myriad of goods and services are now available "online" to a customer. That is, a customer may purchase a wide variety of goods and services through the Internet, which is a global communication system formed by numerous interconnected computer networks. A seller or service provider typically collects payment from the user through an online payment processing system using a credit card or a money transfer from a bank account.

SUMMARY

In general, this disclosure describes an electronic payment processing system that facilitates payment for goods or services using securities, such as stock. For example, the electronic payment processing system allows an end user to utilize stock as a form of currency in connection with an online or in person transaction. Moreover, the electronic payment processing system may seamlessly present stock as an option as a form of payment along with other options, such as credit card or electronic transfer. In this way, use of stock as a form of payment is seamlessly integrated into the online environment provided by a network, such as the Internet.

In one example, the electronic payment processing system interacts with web-based and mobile-based software applications for the conversion of stock to cash from one entity to another in an advantageous way to both parties. In other examples, the electronic payment processing system may also provide consumers the ability to perform credit card transfers and bank transfers based on automated conversion of stock as well as margin accounts for payment of bills.

In one example, a method includes receiving, with at least one processor of an electronic payment processing system, data indicating an electronic payment request for a transaction associated with a provider of goods or services. The method may include processing the data indicating the electronic payment request, with the at least one processor of the payment processing system, to access a data store of a data storage device to identify one or more accounts associated with a recipient of the goods or services and to determine whether the identified accounts have a sufficient amount of securities to satisfy an amount specified by the electronic payment request. The method may include, when the identified account has a sufficient amount of securities to satisfy the amount specified by the payment request, automatically generating, with the at least one processor of the electronic payment processing system, an electronic response message from the payment processing system indicating pending payment for the transaction.

In one example, a computing device includes at least one processor, wherein the at least one processor is configured to receive data indicating an electronic payment request for a transaction associated with a provider of goods or services. The at least one processor may be configured to process the payment request with a payment processing system to access a data store of a data storage device to identify one or more accounts associated with a recipient of the goods or services and to determine whether the identified accounts have a sufficient amount of securities to satisfy an amount specified by the electronic payment request. The at least one processor may be configured to, when the identified account has a sufficient amount of securities to satisfy the amount specified by the payment request, automatically generate an electronic response message from the payment processing system indicating pending payment for the transaction.

In one example, a computer-readable storage medium is encoded with instructions that, when executed, cause at least one processor to receive data indicating an electronic payment request for a transaction associated with a provider of goods or services. The computer-readable storage medium may be encoded with instructions that, when executed, cause at least one processor to process the payment request with a payment processing system to access a data store of a data storage device to identify one or more accounts associated with a recipient of the goods or services and to determine whether the identified accounts have a sufficient amount of securities to satisfy an amount specified by the electronic payment request. The computer-readable storage medium may be encoded with instructions that, when executed, cause at least one processor to, when the identified account has a sufficient amount of securities to satisfy the amount specified by the payment request, automatically generate an electronic response message from the payment processing system indicating pending payment for the transaction.

In one example, a method includes receiving, with at least one processor of an electronic payment processing system, data indicating an electronic payment request for donation of securities to a charity by a donor. The method may also include processing the data indicating the electronic payment request, with the at least one processor of the payment processing system, to access a data store of a data storage device to identify one or more accounts associated with a donor and to determine whether the identified accounts have a sufficient amount of securities to satisfy an amount specified by the electronic payment request. The method may also include, when the identified account has a sufficient amount of securities to satisfy the amount specified by the electronic payment request, automatically generating, with the at least one processor of the electronic payment processing system, an electronic response message from the payment processing system to the charity indicating pending payment of the donation.

In one example, a computing device includes at least one processor, wherein the at least one processor is configured to receive data indicating an electronic request for donation of securities to a charity by a donor. The at least one processor may be configured to process the data indicating the electronic payment request to access a data store of a data storage device to identify one or more accounts associated with a donor and to determine whether the identified accounts have a sufficient amount of securities to satisfy an amount specified by the electronic payment request. The at least one processor may be configured to, when the identified account has a sufficient amount of securities to satisfy the amount specified by the electronic payment request, automatically generate an electronic response message from the electronic payment processing system to the charity indicating pending payment of the donation.

In one example, a computer-readable storage medium is encoded with instructions that, when executed, cause at least one processor to receive data indicating an electronic request for donation of securities to a charity by a donor. The computer-readable storage medium may be encoded with instructions that, when executed, cause at least one processor to process the data indicating the electronic payment request to access a data store of a data storage device to identify one or more accounts associated with a donor and to determine whether the identified accounts have a sufficient amount of securities to satisfy an amount specified by the electronic payment request. The computer-readable storage medium may be encoded with instructions that, when executed, cause at least one processor to, when the identified account has a sufficient amount of securities to satisfy the amount specified by the electronic payment request, automatically generate an electronic response message from the electronic payment processing system to the charity indicating pending payment of the donation.

In one example, a method includes receiving, with at least one processor of an electronic payment processing system and from a computing device of a user, data indicating an electronic request for a debit instrument. The method may also include processing the data indicating an electronic request for a debit instrument, with at least one processor of the electronic payment processing system, to access a data store of a data storage device to identify one or more accounts associated with the user and to determine whether the identified accounts have a sufficient amount of securities to satisfy an amount specified by the request. The method may also include, when the identified account has a sufficient amount of securities to satisfy the amount specified by the request, automatically generating, with the at least one processor of the electronic payment processing system, the debit instrument with a redemption value based on the amount specified in the electronic request.

In one example, a computing device includes at least one processor, wherein the at least one processor is configured to receive, from a second computing device of a user, data indicating an electronic request for a debit instrument. The at least one processor may be configured to process the data indicating an electronic request for a debit instrument to access a data store of a data storage device to identify one or more accounts associated with the user and to determine whether the identified accounts have a sufficient amount of securities to satisfy an amount specified by the request. The at least one processor may be configured to, when the identified account has a sufficient amount of securities to satisfy the amount specified by the request, automatically generate the debit instrument with a redemption value based on the amount specified in the electronic request.

In one example, a computer-readable storage medium is encoded with instructions that, when executed, cause at least one processor to receive, from a second computing device of a user, data indicating an electronic request for a debit instrument. The computer-readable storage medium may be encoded with instructions that, when executed, cause at least one processor to process the data indicating an electronic request for a debit instrument to access a data store of a data storage device to identify one or more accounts associated with the user and to determine whether the identified accounts have a sufficient amount of securities to satisfy an amount specified by the request. The computer-readable storage medium may be encoded with instructions that, when executed, cause at least one processor to, when the identified account has a sufficient amount of securities to satisfy the amount specified by the request, automatically generate the debit instrument with a redemption value based on the amount specified in the electronic request.

In one example, an electronic payment processing system includes an interface to receive an electronic payment request for a transaction associated with a provider of goods or services. The electronic payment processing system may include a processor configured to execute program code for processing the payment request with a payment processing system to identify one or more accounts associated with a recipient of the goods or services and to determine whether the identified accounts have a sufficient amount of securities to satisfy an amount specified by the payment request. In some examples, the program code issues an electronic response message from the payment processing system indicating pending payment for the transaction when the identified account has a sufficient amount of securities to satisfy the amount specified by the payment request.

In one example, an electronic payment processing system includes means for receiving an electronic payment request for a transaction associated with a provider of goods or services. The electronic payment processing system may also include means for processing the payment request with a payment processing system to identify one or more accounts associated with a recipient of the goods or services and to issue electronic payment for the transaction using securities sufficient to satisfy the amount specified by the payment request.

In one example, a system for donating securities includes a donor computing device of a donor; a donee computing device of a donee; and an electronic payment processing system. The donor computing device may output for display, a first user interface that includes one or more user interface elements to receive information that indicates one or more securities of the donor and specifies a transfer of the one or more securities as a donation. Responsive to receiving one or more user inputs that indicate the information for the one or more user interface elements, the donor computing device may send one or more messages to the electronic payment processing system that includes the information indicating the one or more securities and specifying the transfer of the one or more securities as the donation. Responsive to receiving the one or more messages, the electronic payment processing system may automatically retitle the one or more securities of the donor to the donee. The donee computing device may output for display, a second user interface that includes one or more user interface elements to receive information that indicates the one or more securities received as the donation. The donee computing device may receive a user input that defines a conversion of at least a portion of the one or more securities received as the donation to cash. Responsive to receiving the user input, the donee computing device may send one or more messages to the electronic payment processing system that include the information indicating the one or more securities and the conversion of at least the portion of the one or more securities received as the donation to cash. Responsive to receiving the one or more messages, the electronic payment processing system may automatically convert the one or more securities to cash.

In one example, a system for provisioning a cash payment using securities may include a payment sender computing device of a payment sender. The system may include a payment receiver computing device of a payment receiver and an electronic payment processing system. The payment sender computing device may output for display, a first user interface that includes one or more user interface elements to receive information that indicates one or more securities of the payment sender and specifies a cash payment to the payment receiver based on a sale of the one or more securities. Responsive to receiving one or more user inputs that indicate the information for the one or more user interface elements, the payment sender computing device may send one or more messages to the electronic payment processing system that include the information indicating the one or more securities and the cash payment to the payment receiver based on from the sale of the one or more securities. Responsive to receiving the one or more messages, the electronic payment processing system may automatically converts the one or more securities of the payment sender to cash and deposits the cash in an account of the payment receiver. The payment receiver computing device may output for display, a second user interface that includes information indicating the cash in the account of the payment receiver resulting from the sale of the one or more securities.

In one example, a computing device may output for display, a user interface that includes one or more user interface elements to receive information that indicate one or more securities and at least one of: a transfer of the one or more securities as a donation, and a cash payment to a provider of goods or services based on a sale of the one or more securities. The computing device may receive information indicating the one or more securities and the at least one of the transfer and the cash payment. The computing device may generate one or more messages that include the information indicating the one or more securities and the at least one of the transfer and the cash payment. The computing device may send to an electronic payment processing system, the one or more messages.

In one example, a computing device includes at least one processor, wherein the at least one processor is configured to output for display, a user interface that includes one or more user interface elements to receive information that indicate one or more securities and at least one of: a transfer of the one or more securities as a donation, and a cash payment to a provider of goods or services based on a sale of the one or more securities. The at least one processor may be configured to receive information indicating the one or more securities and the at least one of the transfer and the cash payment. The at least one processor may be configured to generate one or more messages that include the information indicating the one or more securities and the at least one of the transfer and the cash payment. The at least one processor may be configured to send to an electronic payment processing system, the one or more messages.

In one example, a computer-readable storage medium is encoded with instructions that, when executed, cause at least one processor to output for display, a user interface that includes one or more user interface elements to receive information that indicate one or more securities and at least one of: a transfer of the one or more securities as a donation, and a cash payment to a provider of goods or services based on a sale of the one or more securities. The computer-readable storage medium may be encoded with instructions that, when executed, cause at least one processor to receive information indicating the one or more securities and the at least one of the transfer and the cash payment; and generate one or more messages that include the information indicating the one or more securities and the at least one of the transfer and the cash payment. The computer-readable storage medium may be encoded with instructions that, when executed, cause at least one processor to send to an electronic payment processing system, the one or more messages.

In one example, a computing device may output for display, a user interface that includes one or more user interface elements to receive information that indicates one or more securities received as a donation. The computing device may receive a user input that specifies a conversion of at least a portion of the one or more securities received as the donation to cash. The computing device may generate one or more messages that include the information indicating the one or more securities and specifying the conversion of at least the portion of the one or more securities received as the donation to cash. The computing device may to an electronic payment processing system, the one or more messages.

In one example, a computing device includes least one processor, wherein the at least one processor is configured to: output for display, a user interface that includes one or more user interface elements to receive information that indicates one or more securities received as a donation. The at least one processor may be configured to receive a user input that specifies a conversion of at least a portion of the one or more securities received as the donation to cash; generate one or more messages that include the information indicating the one or more securities and specifying the conversion of at least the portion of the one or more securities received as the donation to cash; and send to an electronic payment processing system, the one or more messages.

In one example, a computer-readable storage medium is encoded with instructions that, when executed, cause at least one processor to: output for display, a user interface that includes one or more user interface elements to receive information that indicates one or more securities received as a donation. The computer-readable storage medium may be encoded with instructions that, when executed, cause at least one processor to: receive a user input that specifies a conversion of at least a portion of the one or more securities received as the donation to cash; generate one or more messages that include the information indicating the one or more securities and specifying the conversion of at least the portion of the one or more securities received as the donation to cash; and send to an electronic payment processing system, the one or more messages.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a conceptual diagram illustrating a user interface to select a brokerage firm from an aggregation service in accordance with the current disclosure.

FIG. 7A is a conceptual diagram illustrating a user interface to receive user input authentication credentials using an aggregation service in accordance with the current disclosure.

FIG. 7B is a conceptual diagram illustrating a user interface to receive input user authentication credentials using an aggregation service in accordance with the current disclosure.

FIG. 7C is a conceptual diagram illustrating a user interface to receive a user input that indicates whether to make a donation or cash payment using securities in accordance with the current disclosure.

DETAILED DESCRIPTION

Figure 1:
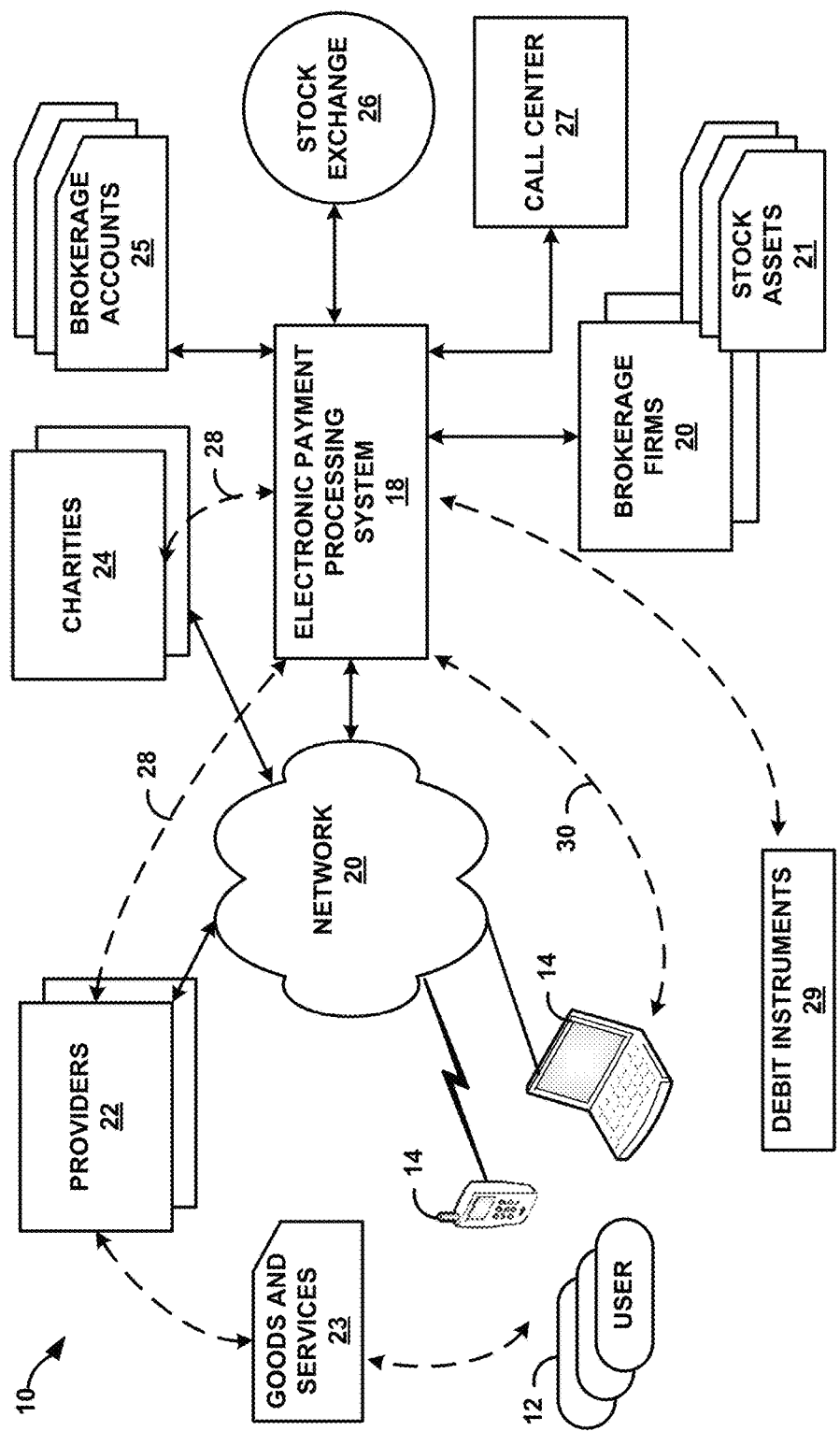
FIG. 1 is a block diagram illustrating an example network in which an electronic payment processing system facilitates payment for goods and services using securities.

FIG. 1 is a block diagram illustrating an example network system 10 in which an electronic payment processing system 18 facilitates payment for goods and services using securities, such as stock. In the example of FIG. 1, users 12 obtain goods or services 23 from providers 22. In general, providers 22 may be any type of organization that offers a product or service, such as car dealers, real estate firms, health care providers, educational institutions and the like. For example, one or more of providers 22 may be automotive dealers that sell or lease automobiles. In another example, one or more of providers 22 may be universities that provide educational services for tuition from users 12. Other examples of goods or services 23 for which users 12 may utilize stock assets 21 as payment include consumer electronics, luxury vehicles, travel services, jewelry, medical bills, insurance bills, utility bills, rent, content service providers, etc.

Moreover, providers 22 may offer their goods and services through traditional distribution channels, over network 20, or both. Network 20 may represent a global network, such as the Internet or a portion thereof, or may represent a smaller public or proprietary network, including a local area network (LAN), a wide area network (WAN) or any other network in inter-connected computers. Electronic payment processing system 18 may be used to facilitate use of stock assets 21 as payment for goods and services 23 ordered online via network 20. In this case, users 12 may interact with computing devices 14 to access providers 22 of goods and services. For example, providers 22 may maintain websites, auctions, exchanges, applications or other forms of network destinations that are accessible to users 12 via global network 20. Although providers 22 are described as offering a product or service, as further described in this disclosure, donors, charities, and other recipients may similarly interact with electronic payment processing system 18 and similar techniques described with respect to providers 22 may apply to such donors, charities, and other recipients. Computing devices 14 may be, for example, laptop or desktop computers, servers, mobile phones, telephones, personal digital assistants (PDAs), tablet computers, work stations, electronic gaming consoles, e-readers, or other mobile computing devices.

In other examples, electronic payment processing system 18 facilitates use of stock assets 21 as payment for goods and services 23 purchased using more conventional means, such as by retail store, catalog, telephone order, and the like. For example, using techniques of the disclosure, user 12 may enter a retail store to purchase a product such as a television. Using one of computing devices 14 that implement techniques of the disclosure (e.g., a smartphone), user 12 can use electronic payment processing system 18 to send payment for the television to provider 22 using stock.

In one example, user 12 initiates payment processing. In this example, user 12 may interact with computing devices 14 to select stock as a form of payment method. For example, user 12 may interact with a website or other network resource of providers 22 to select stock as a payment method for transactions. Transactions generally may include the transfer of securities as donations or the provisioning of cash for a cash payment based on the sale of securities, in accordance with techniques of this disclosure. In this case, application-layer software executing web systems hosted by providers 22 issue requests for electronic payment processing system 18 to initiate stock settlement for payment. In another example, user 12 may interact with electronic payment processing system 18 to initiate stock settlement of financial obligations to providers 22.

Electronic payment processing system 18, may receive data indicating an electronic payment request for a transaction associated with a provider of goods or services. Data indicating the request may, generally, specify any information suitable to transfer securities as a donation or to provision a cash payment in accordance with techniques of the disclosure. Example information may include, but is not limited to, user information, account information, balance information, receiver information, etc.

Upon receiving a request to initiate use of stock assets 21 as payment, electronic payment processing system 18 first authenticates the request. This may be performed in a variety of ways. For example, electronic payment processing system 18 may use authentication techniques, such as two-factor authentication to authenticate the identity of user 12, in which the user provides multiple authentication credentials. Authentication credentials may include user name, password, pin, identifiable picture, speech, fingerprint, etc. Electronic payment processing system 18 may receive the authentication credentials from computing device 14 and authenticate user 12. Furthermore, electronic payment processing system 18 may determine whether user 12 has authorization to perform various actions requested by computing device 14.

Figure 2:
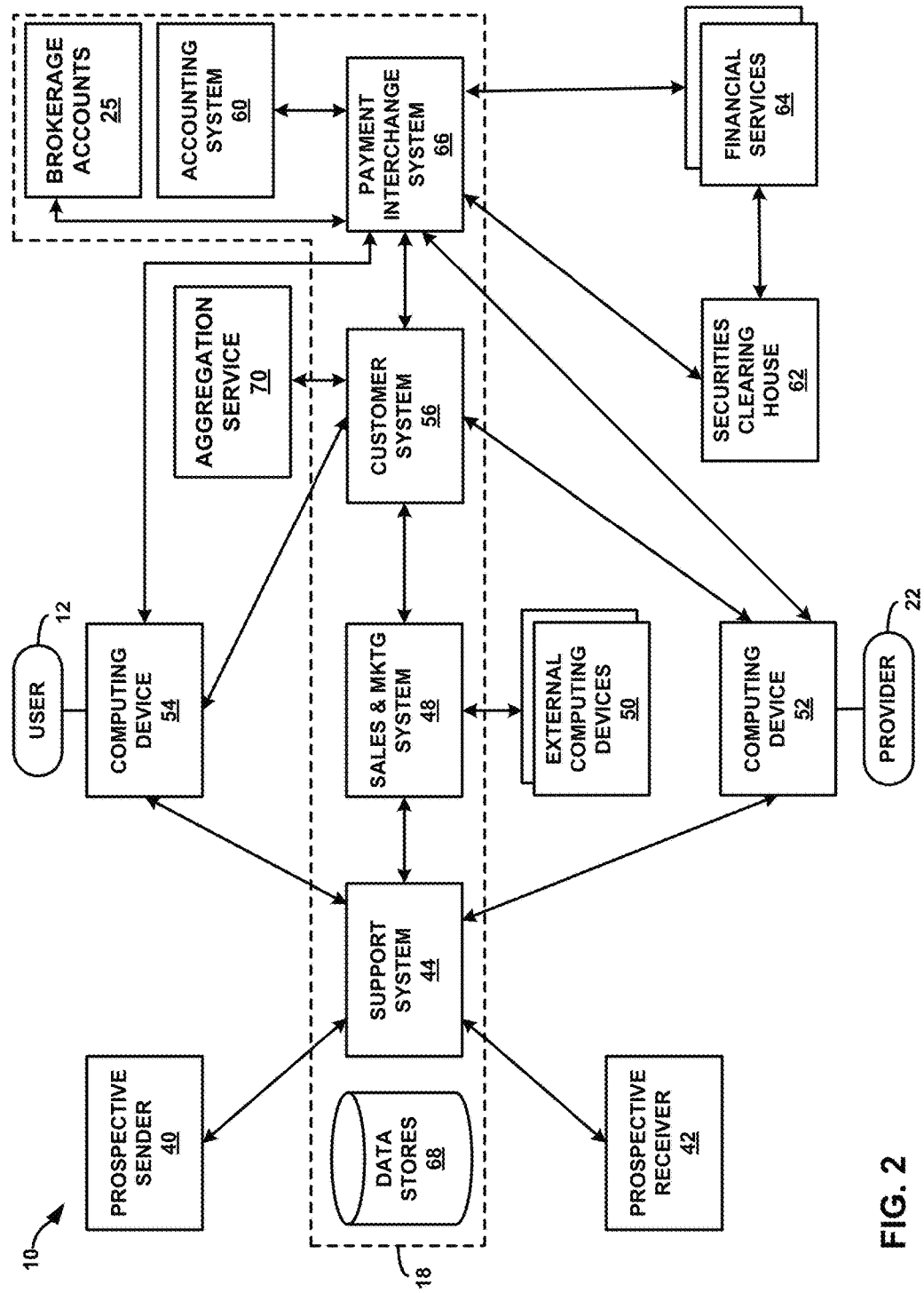
FIG. 2 is a conceptual diagram illustrating further details of the example network system of FIG. 1, in accordance with one or more techniques of the present disclosure.

Upon authenticating the request, electronic payment processing system 18 communicates with one or more of brokerage firms 20 to determine whether the user 12 has sufficient stock assets that can be liquidated to cover the requested payment. That is, electronic payment processing system, may process the data indicating the electronic payment request to access a data store of a data storage device to identify one or more accounts associated with a recipient of the goods or services and to determine whether the identified accounts have sufficient stock assets to satisfy an amount specified by the electronic payment request. For instance, as shown in FIG. 2, electronic payment processing system 18 may include one or more data stores that maintain information including, but not limited to, account information, transaction information, user information, and any other information suitable to facilitate the transfer and/or sale of securities for donations or cash payment. Electronic payment processing system may access records corresponding to information about accounts user 12 that include securities. In some examples, the data stores may be stored on one or more data storage devices, which may generally include any such storages devices as described in FIG. 5.

If sufficient stock assets exist to complete the payment, electronic payment processing system 18 facilitates the transfer of the stock assets from brokerage firms 20 to one or more of brokerage accounts 25 that are associated with user 12. In some examples, electronic payment processing system 18 may provide for accounting of tax consequences associated with the transfer of assets. Brokerage accounts 25 may be accounts that store stock assets associated with user 12. In some examples, brokerage accounts 25 may be maintained by electronic payment processing system 18, while in other examples, brokerage accounts 25 may be maintained by a separate brokerage system (not shown) that can exchange information with electronic payment processing system 18. In one example, an entity (e.g., a legal entity such as a corporation, partnership, etc.), may own, control and/or maintain, electronic payment processing system 18, brokerage accounts 25, the brokerage system, etc. In some examples, electronic payment processing system 18 (or the brokerage system in alternative examples) may facilitate the retitling of ownership of the stock assets from user 12 to providers 22 as further described in FIG. 2.

Upon transferring the stock assets to one or more of brokerage accounts 25, electronic payment processing system 18 may reserve certain stock assets 21 such that the stock assets 21 cannot be separately sold or transferred while the stock assets 21 are instead being used as payment by user 12. In this way, real-time payment processing for transactions by users 12 using stock assets 21 as a form of payment is not delayed in the event liquidating the stock assets 21 on stock exchanges 26 may require certain processing time. In some examples, electronic payment processing system 18 may output one or more electronic messages to direct a transfer of at least a portion of the stock assets from the one or more accounts to a receiving account to satisfy the amount specified by the electronic payment request. For example, upon receiving confirmation that sufficient stock assets 21 may be reserved (i.e., locked or otherwise restricted), electronic payment processing system 18 outputs electronic messages 28 authorizing electronic fund transfer from electronic payment processing system 18 to provider 22 from which the good or service was or will be purchased. When the identified account has sufficient stock assets to satisfy the amount specified by the payment request, electronic payment processing system 18 may automatically generate an electronic response message indicating pending payment for the transaction.

Electronic payment processing system 18 may initiate an electronic transfer of a specified dollar amount from a bank account associated with electronic payment processing system 18 or managed by the electronic payment processing system 18 for user 12. Upon transfer of the portion of the stock assets to the receiving account, electronic payment processing system 18 may perform an electronic transfer of a dollar amount to the provider to satisfy payment of the amount specified by the payment request. In an alternative example, prior to transfer of the portion of the stock assets to the receiving account, electronic payment processing system 18 may perform an electronic transfer of a dollar amount to the provider to satisfy payment of the amount specified by the payment request. In still other examples, upon a sale of the portion of stock assets, electronic payment processing system 18 may perform an electronic transfer of a dollar amount to the provider to satisfy payment of the amount specified by the payment request. In another example, prior to a sale of the portion of the stock assets, electronic payment processing system 18 may perform an electronic transfer of a dollar amount to the provider to satisfy payment of the amount specified by the payment request. In some examples, electronic payment processing system 18 does not output confirmation messages to provider 22 until stock assets 21 have been liquidated. In an alternative embodiment, electronic payment processing system 18 may send one or more electronic messages that instruct brokerage firms 20 to reserve stock assets 21.

In any case, electronic payment processing system 18 controls the liquidation of sufficient stock assets 21 to cover the obligation to provider 22 from which the good or service was or will be received. For example, electronic payment processing system 18 may initiate transfer of sufficient stock assets 21 to a fund associated with the electronic payment processing system 18 where the stock assets 21 can be liquidated. In some examples, electronic payment processing system 18 may output one or more electronic messages to direct a sale of at least a portion of the stock assets from the one or more accounts to a receiving account to satisfy the amount specified by the payment request. For instance, electronic payment processing system 18, generally, may generate and/or output messages to one or more of stock exchange 26, brokerage firms 20, providers 22, brokerage accounts 25, etc. An entity associated with electronic payment processing system 18 may in turn receive a processing fee for the sale of stock assets 21.

In another example, electronic payment processing system 18 facilitates donation of stock assets 21 to one or more charities 24. User 12 may initiate a donation of stock assets 21 in a variety of ways. For example, user 12 may access a website presented by a given charity 24 and indicate that a financial amount is to be donated and that the stock assets 21 are to be used for payment of the transaction. User 12 or the receiving charity 24 may specify whether stock assets 21 are to be transferred to charities 24 or whether a cash transfer is to be made. Thus, in some examples, electronic payment processing system 18 may receive data indicating an electronic payment request for donation of stock assets to a charity by a donor. Electronic payment processing system 18 may then process the data indicating the electronic payment request to access a data store of a data storage device to identify one or more accounts associated with a donor and to determine whether the identified accounts have sufficient stock assets to satisfy an amount specified by the electronic payment request. If the identified account has sufficient stock assets to satisfy the amount specified by the electronic payment request, electronic payment processing system 18 may automatically generate an electronic response message from the payment processing system to the charity indicating pending payment of the donation.

In the case of a cash transfer using stock assets, electronic payment processing system 18 may seamlessly interact with stock exchange 26 to sell a required amount of stock assets 21 to satisfy the cash transfer. In such examples, electronic payment processing system 18 retitles ownership of the stock from user 12 to charities 24 and then subsequently sells the assets. Retitling the stock assets to charities 24 prior to sales may achieve tax benefits on the appreciation of the stock assets. Electronic payment processing system 18 may then generate and provide user 12 with completed tax forms as a record of the charitable donation. As will be further described in the following figures, an accounting system (e.g., accounting system 60 as shown in FIG. 2), in some examples, may generate and provide user 12 with the completed tax forms.

In another example, electronic payment processing system 18 facilitates automatic issuance of debit instruments 29 (physical or electronic certificates) that may be redeemed at any of providers 22, where electronic payment processing system 18 generates the debit instruments by automatically and seamlessly selling sufficient stock assets 21. In some examples, the debit instruments may include debit cards. Electronic debit instruments may include electronic debit cards. Thus, in some examples, electronic payment processing system 18 may receive from a computing device of a user, data indicating an electronic request for a debit instrument. Electronic payment processing system 18 may process the data indicating an electronic request for a debit instrument to access a data store of a data storage device to identify one or more accounts associated with the user and to determine whether the identified accounts have sufficient stock assets to satisfy an amount specified by the request. Electronic payment processing system 18 may, when the identified account has sufficient stock assets to satisfy the amount specified by the request, automatically generating, with the at least one processor of the electronic payment processing system, the debit instrument with a redemption value based on the amount specified in the electronic request.

In some examples of automatically generating a debit instrument, electronic payment processing system 18 may output one or more electronic messages to direct transfer of at least a portion of the stock assets from the one or more accounts to a receiving account to satisfy the amount specified by the request. In some examples of automatically generating a debit instrument, electronic payment processing system 18 may output one or more electronic messages to direct the sale of at least a portion of the stock assets from the one or more accounts to a receiving account to satisfy the amount specified by the request.

In some examples, user 12 may provide payment for goods and services 23 using stock via a call center 27. Call center 27 may include one or more customer service representatives that are accessible to user 12 by telephone, instant messaging, video conferencing, or any other interactive communication. In some examples, customer service representatives may be human representatives and/or automated agents executing at one or more computing devices. User 12 may initiate a communication to call center 27 using one of computing device 14 to make payment using stock. For instance, user 12 may place a phone call to call center 27. A customer service representative may receive payment request information from user 12 and, based on the information, submit the request for payment to providers 22 via electronic payment processing system 18, in accordance with techniques described in this disclosure.

In some examples, user 12 may provide a donation using securities or cash payment based on the sale of such securities using multiple payment types (e.g., "payment forms"). Forms or types of payment may include stock, bonds, debit cards, credit cards, checking accounts or any other suitable forms of payment. As further described in this disclosure, user 12 may specify any number of payment types and respective proportions of amounts of securities and/or cash from each payment type in a payment request. For each of the plurality of payment types, electronic payment processing system 18 may determine a respective proportion of the total amount of the payment request for the payment type. Electronic payment processing system 18 may further, for each of the plurality of payment types, determine a respective account of the one or more accounts associated with the payment type. Electronic payment processing system 18 may perform an electronic transfer of a dollar amount to the provider to satisfy payment of the amount specified by the payment request, wherein the dollar amount comprises a sum of dollar amounts from the respective accounts for each of the plurality of payment types in proportion to each of the respective payment types. In this way, electronic payment processing system 18 can provide a donation using securities or cash payment that includes a least a portion of the payment based on the sale of securities from a combination of any number of payment types.

FIG. 2 is a conceptual diagram illustrating further details of network system 10, in accordance with one or more techniques of the present disclosure. In the example of FIG. 2, a payment sender (e.g., user 12), may send a payment using securities, such as stock, to a payment receiver (e.g., provider 22), using electronic payment processing system 18. In other examples, the payment sender may donate securities to a payment receiver rather than converting such securities to cash.

In the example of FIG. 1, user 12 may purchase an automobile from provider 22 using stock. Initially, computing device 54 generates for display, a graphical user interface that enables user 12 to select, for example, one or more forms of payment and the payment receiver. In some examples, electronic payment processing system 18 may allow user 12 to view multiple accounts of user 12 that are maintained by various brokerage firms in a single aggregated set of one or more views. For instance, electronic payment processing system 18 may retrieve information for one or more accounts of user 12 from an aggregation service and generate information that can be displayed in a single unified view, such that the user can see brokerage firm and securities balance information. In some examples, electronic payment processing system 18 communicates with one or more aggregation services that collect the information for one or more accounts of user 12. Electronic payment processing system 18 may retrieve such information from the aggregation service and send such account information to a computing device of user 12. The computing device of user 12 may display a graphical user interface that allows user 12 make selections when using securities to donate and or make cash payments. In some examples, aggregation provides information for each of user 12's accounts including but not limited to: the brokerage firm name that manages an account of the user 12, an account identifier, one or more identifiers of the securities, the number of shares of each security, the balances of the securities, and the cost basis values of the securities.

User 12 may select a payment receiver from a list of payment receivers or, in other examples, may input information that uniquely identifies the payment receiver. Computing device 54, in some examples, receives customer information for user 12 and provider 22 from customer system 56. Customer system 56 may include one or more datastores 68 that maintain information about each customer of electronic payment process system 18. Datastores 68 may comprise one or more data structures capable of storing information such as a relationship database, map, Online Analytical Processing (OLAP) database, etc. Examples of information about each customer include, name, address, transaction details, etc.

User 12 also selects one or more forms or types of payment. Forms or types of payment may include stock, bonds, debit cards, credit cards, checking accounts, savings accounts, money market accounts, or any other accounts or suitable forms of payment. In the example of FIG. 2, user 12 selects stock as the sole form of payment. In other examples, electronic payment processing system 18 enables user 12 to make a payment using multiple forms of payments. For instance, user 12 may fund 50% of the payment with stock and 50% of the payment with a credit card. Once user 12 has selected stock as the form of payment, the graphical interface of computing device 54 may also enable user 12 to select the particular stock included in user 12's assets that will serve as payment to provider 22. That is, user 12 may have a portfolio with multiple securities and user 12 may select which particular securities to use as payment. User 12 can also provide user input via the graphical user interface to select the quantity of the payment. In other examples, user 12 may provide numerous other user inputs via the graphical user interface of computing device 54 to facilitate payment to provider 22.

User 12 subsequently provides a user input that causes computing device 54 to send the payment information to electronic payment processing system 18. As described in FIG. 1, network communications between various systems of FIGS. 1 and 2 use one or more authentication techniques to secure payment information. Payment interchange system 66, upon receiving the payment information, determines customer information associated with user 12 and provider 22 from customer system 56.

Payment interchange system 66 further determines the quantity of the requested payment and the forms of payment. For each form of payment, payment interchange system 66 determines whether user 12 has sufficient funds for the payment. To determine whether user 12 has sufficient funds, payment interchange system 66 queries one or more financial services 64. Financial services 64 may include stock brokerages, banks, credit card vendors, etc., that manage assets of user 12 that are usable as different forms of payment. For instance, financial services 64 include a stock brokerage that manages stock of user 12 selected for use as payment to provider 22. In the current example, payment interchange system 66 sends a request to financial services 64 that includes the quantity and/or value of stock specified by user 12 and identification of the selected stock.

Based on information of financial services 64, payment interchange system 66 determines whether user 12 has sufficient stock to complete the requested payment to provider 22. If payment interchange system 66 determines that there is insufficient stock to complete the transaction, payment interchange system 66 sends a message to computing device 54 to notify user 12. In the example of FIG. 2, payment interchange system 66 determines that a sufficient amount of stock exists to fund the requested payment to provider 22.

In the example of FIG. 2, electronic payment processing system 18, in some examples, further facilitates the transfer of ownership and conversion of securities, such as stock, to another form of payment such as electronic currency using securities clearinghouse 62. Securities clearinghouse 62 in some examples may clear and settle the transfer of securities from financial services 64 to brokerage accounts 25 that are maintained by electronic payment processing system 18. In accordance with techniques of the disclosure, to convert stock of user 12 to electronic currency in order to pay provider 22, payment interchange system 66 initially sends a request to securities clearinghouse 62 to electronically transfer custody of the stock to brokerage accounts 25. The request, in some examples, includes authorization information to authorize the transfer and identification of the stock to transfer.

Upon determining that securities clearinghouse 62 has transferred custody of the stock to payment interchange system 66, payment interchange system 66 sends information to accounting system 60 to indicate the transfer of stock to electronic payment processing system 18. Accounting system 60 may perform one or more accounting functions, such as maintaining records of securities and other assets associated with customers. Other functions may include maintaining records of transactions between customers, such as sending a payment from one customer to another. As further described in this disclosure, in some examples, electronic payment processing system 18 may therefore perform an automated re-titling of the securities, and in some examples, conversation to cash without further user intervention following the initial request to transfer the securities. Accounting system 60 may perform any other suitable accounting functions to maintain state information of securities, transactions, etc.

Once electronic payment processing system 18 has facilitated the transfer of custody of the stock to brokerage accounts 25, payment interchange system 66 converts the stock to electronic currency. In some examples, payment interchange system 66 may facilitate the retitling of stock ownership from user 12 to provider 22 prior to converting the stock to electronic currency.

In some examples, payment interchange system 66 may query, for example, multiple stock exchanges to identify a price and/or prospective purchasers for the stock. Upon determining a price and purchaser for the stock in the example of FIG. 2, payment interchange system 66 sends a request to securities clearinghouse 62 to transfer the stock to the purchaser in exchange for electronic currency. Securities clearinghouse 62 performs one or more transactions to transfer custody of the stock to the purchaser. Securities clearinghouse 62 may send and/or receive payment for the stock to payment interchange system 66 in the form of electronic currency. In other examples, payment interchange system 66 may communicate with securities clearinghouse 62 to transfer the stock, and payment interchange system 66 may communicate separately with, e.g., financial services 64 to send and receive electronic currency as payment for the stock.

In the current example, payment interchange system 66, upon receiving the payment from securities clearinghouse 62, sends information to accounting system 60 to indicate the transfer of custody of the stock and the receipt of electronic currency as payment for the stock. Accounting system 60 updates records to indicate the payment of electronic currency is associated with an account of user 12.

To send notice of payment to computing device 52 of provider 22, payment interchange system 66 sends a message that specifies payment information. Such payment information may include authentication credentials associated with user 12. Other payment information may include the quantity of the payment to provider 22. Payment information may also include identification of the account of user 12 that includes electronic currency for payment to provider 22.

In some examples, computing device 52 receives the message that specifies the payment information and records the payment to an account of provider 22 that is managed by computing device 52. Computing device 52 may also send a message that confirms the payment has been received to payment interchange system 66. Payment interchange system 66 may send information to accounting system 60 to record the decrease in electronic currency associated with the account of user 12.

As shown in FIG. 2, electronic payment processing system 18 also includes a sales and marketing system 48. In some examples, sales and marketing system 48 may include sales and marketing information, such as promotional information, discount information, advertisements, and any other suitable information for marketing services of electronic payment processing system 18. In some examples, electronic payment processing system 18 may send sales and marketing information to external communication devices 50. External computing devices 50, such as phones, tablet computers, laptop computers, etc., receive and display the sales and marketing information to prospective users.

Electronic payment processing system 18 also includes support system 44. Support system 44 may provide one or more customer functions. In some examples, support system 44 may include a customer relationship management system, call center, etc. Consequently, a prospective payment sender 40 and/or prospective payment receiver 42 may send inquiries to support system 44 and receive corresponding answers and assistance regarding the services of electronic payment processing system 18. For instance, prospective sender 40 may receive information about services of electronic payment processing system 18 using instant messaging while prospective receiver 42 may request information using a call center phone number. In other examples, support system 44 can implement any suitable functionality to provide customer support to prospective customers.

In another example, the system of FIG. 2 may be used to perform a donation of securities from a payment sender to a payment receiver. Initially, user 12 may provide a user input to computing device 54 that causes computing device 54 to display a user interface that enables user 12 (e.g., donor) to donate securities to a payment receiver (e.g., a donee). In some examples, the user interface may be provided by an application installed on computing device 54. For instance, computing device 54 may be a smartphone or tablet that includes an application that enables the user 12 to make a donation of securities in accordance with techniques of the disclosure. In other examples, computing device 54 may include a web browser or other application that retrieves content from payment interchange system 66 that can be displayed by computing device 54. The content may be a web page or other information that, when displayed as a user interface, enables user 12 to make one or more donations of securities.

Computing device 54 may display a user interface that enables user 12 to make a donation of securities. In particular, the user interface may, as further illustrated in FIGS. 7-13, provide user interface elements, such as drop-down menus, checkboxes, etc., to choose various parameters of the donation. For instance, user 12 may select, from a list of brokers output for display by computing device 54, a broker that currently maintains custody of user 12's securities that the user wishes to donate. User 12 may further provide user input at the user interface of computing device 54 using the user interface to select and/or provide one or more identifiers of the securities (e.g., one or more securities ticker symbols). User 12 may also provide user input at computing device 54 to specify the quantities of securities that the user wishes to donate. In addition, user 12 may provide user input at computing device 54 to specify the payment receiver (e.g., donee). In accordance with techniques of the disclosure, the user interface provided by computing device 54, may provide user 12 with options, including but not limited to, donating securities or making cash payments using securities.

In the current example of FIG. 2, the user wishes to make a donation of the securities and therefore provides user input at the user interface provided by computing device 54 to make a donation of securities based on the previous user inputs that user 12 provided including, but not limited to: user identity of user 12, securities identifier(s) (e.g., ticker symbol(s)), quantity of securities, payment receiver (e.g., donee). Upon receiving the user input to make the donation of securities, computing device 54 may generate a message that corresponds to information provided by user 12. Computing device 54 may send the message to electronic payment processing system 18. In some examples, computing device 54 generates a session with customer payment interchange system 66. The session may use authentication and encryption to provide for secure transmission of the message.

Payment interchange system 66 of electronic payment processing system 18 may initially receive the message. Upon receiving the message, payment interchange system 66 may verify, using customer system 56, that the user identifier of user 12 (and in some examples, authentication credentials such as a password) that is specified in the message matches a user identifier in customer system 56. Upon confirming that the user identifier is valid with customer system 56, payment interchange system 66 may generate a transfer message to be sent to securities clearinghouse 62 to transfer the requested securities for donation from user 12's external brokerage firm account to an account of user 12 that is managed by electronic payment processing system 18.

In some examples, the transfer message specifies an account identifier of the source account of user 12 for the brokerage firm that currently maintains custody of the securities, the one or more identifiers of the securities, the one or more quantities of the respective securities, and the destination account of user 12 to which the securities will be transferred. In accordance with techniques of the disclosure, electronic payment processing system 18 will manage the destination account for user 12. For example, user 12 may have an account in brokerage accounts 25 that is managed by electronic payment processing system 18. Therefore, the transfer of securities when making a donation, may cause the securities to be transferred from an external brokerage firm (e.g., financial services 64) to user 12's brokerage account that is managed by electronic payment processing system 18 in an inter-brokerage transfer. Electronic payment processing system 18 may then perform an intra-brokerage transfer from user 12's account in broker accounts 25 to the payment receiver (e.g., donee) account that is also managed in brokerage accounts 25 by electronic payment processing system 18.

To initiate the inter-brokerage transfer, payment interchange system 66 may send the transfer message to securities clearinghouse 62. In some examples, securities clearinghouse 62 may be the Automated Customer Account Transfer Service (ACATS). Securities clearinghouse 62, upon receiving the transfer message, generates an inter-brokerage message that specifies information, including but not limited to, an brokerage identifier of the brokerage firm that currently maintains custody of the securities to be donated, an account identifier of user 12's account with the identified brokerage firm, a quantity of one or more securities specified by the transfer message received initially from payment interchange system 66, and one or more identifiers of the one or more securities specified in the transfer message.

Securities clearinghouse 62 sends the inter-brokerage message to the brokerage firm of financial services 64 that is identified by the brokerage identifier. The brokerage firm of financial services 64 verifies that the transfer of securities specified by the inter-brokerage message can be completed. That is, the brokerage firm determines that the account associated with user 12 has the specified securities and the specified quantity. If the transfer of securities cannot be completed, financial services 64 may send a notification message to securities clearinghouse 62, which in turn sends a notification to payment interchange system 66 that can further send a notification to computing device 54 that the transfer cannot be completed (e.g., insufficient quantity of securities, no matching securities to identifier indicated in inter-brokerage message, etc.).

If the brokerage firm of financial services 64 determines that the transfer can be completed, the brokerage firm sends a confirmation message to securities clearinghouse 62. Responsive to receiving the confirmation message, securities clearinghouse 62 determines the identifier of the brokerage account of user 12 in brokerage accounts 25 that are managed by electronic payment processing system 18. The identifier of the brokerage account was previously sent by payment interchange system 66 to securities clearinghouse 62 when the initial transfer message was sent by payment interchange system 66. Upon determining the identifier of the brokerage account, securities clearinghouse 62 records information indicating the transfer of securities from the original brokerage firm that maintained the securities to user 12's account in brokerage accounts 25. Securities clearinghouse 62 then sends a confirmation message to payment interchange system 68 that indicates the securities have been transferred from the original brokerage firm of financial services 64 to user 12's account of brokerage accounts 25 that are managed by electronic payment processing system 18. Payment interchange system 66, upon receiving the confirmation message may confirm the accuracy of the transaction and/or send information of the message to accounting system 60. Accounting system 60 may update information in data stores 68 to indicate that the securities are maintained in user 12's account included in brokerage accounts 25.

In accordance with techniques of the disclosure, to perform the transfer of securities as a donation, payment interchange system 66 may automatically retitle the securities from user 12's account in brokerage accounts 25 to the payment receiver's account in brokerage accounts 25. Such retitling techniques may improve the speed and/or ease of providing securities as donation and/or cash payment. In such examples, by performing the retitling operations as an intra-brokerage transfer, fewer messages may be sent by electronic payment processing system, thereby reducing network usage and/or improving security of such transactions. Moreover, such retitling techniques may provide for centralized recordation and reporting that may improve the accuracy and/or efficiency of record-keeping and reporting for users that make donations of securities or cash payment resulting from the sale of securities. Although example retitling techniques of FIG. 2 are described using an intra-brokerage transfer, one or more operations of the techniques may be performed by communicating with using one or more systems external to electronic payment processing system while still realizing one or more benefits provided by techniques of the disclosure.

The retitling process to transfer the securities as a donation as performed by electronic payment processing system 18 is now further described herein. In some examples, electronic payment processing system 18 may operate as a brokerage firm that maintains records of ownership of securities. For instance, data stores 68 may include an internal register that indicates information including but not limited to the owner of a security and the quantity of the security owned by the owner. When payment interchange system 18 performs an intra-brokerage transfer of securities as a donation in response to receiving an transfer message from computing device 54 and the subsequent confirmation message from securities clearinghouse 62, payment interchange system 66 sends information to accounting system 60 that indicates user 12's source account of brokerage accounts 25 that currently includes the securities to be donated, the donor's destination account of brokerage accounts 25 to which the securities will be transferred, the quantity of the securities, and the identifiers of the securities.

Accounting system 60 verifies that the quantity and identify of the securities exists in user 12's account of brokerage accounts 25. Upon verifying that the intra-brokerage transfer may be completed, accounting system 60 updates the internal register of data stores 60 to indicate that the securities are retitled to the payment receiver (e.g., donee). Specifically, accounting system 60 updates the internal register to indicate that securities are not titled to user 12's account of brokerage accounts 25 and that the securities are titled to the payment receiver's account of brokerage accounts 25. By retitling the securities, accounting system 60 indicates the change in ownership of the securities from user 12 to the payment receiver, thereby performing a donation of the securities from user 12 to the payment receiver. In some examples, prior to or subsequent to the intra-brokerage transfer, payment interchange system 66 may charge a fee for the transfer. Accounting system 60 may record the fee charged and user to whom the fee is charged. In some examples, accounting system 60 may deduct cash from a cash account of the user for the fee.

In one example, an electronic payment processing system may receive from a securities clearinghouse system, an indication of a transfer of securities from a first account of a first user to a second account of the first user, wherein the second account of the first user is maintained by the electronic payment processing system. The electronic payment processing system may update a register included in a data store of a storage device to indicate a transfer of ownership of the securities from the first user to a second user. The electronic payment processing system may update account information included in the data store of the storage device to indicate a transfer of the securities from the second account of the first user to a third account of the second user.

In some examples, payment interchange system 66 may apply one or more business rules to securities once the securities are transferred to the account of the payment receiver. For instance, payment interchange system 66 may automatically convert the securities to cash based on a business rule. A business rule in some examples may be configured by the payment receiver. In the example of FIG. 2, the payment receiver may have configured a business rule to convert any donated securities to cash. The business rule may therefore specify the type of transaction (e.g., donation) and destination account in brokerage accounts 25 that will store the cash from the converted securities. Payment interchange system 66, upon determining that a business rule is associated with transfer of securities, determines that the type of transfer is a donation. Consequently, payment interchange system 66 performs a sale of the securities by submitting a sell order for the securities to one or more securities exchanges.

Upon receiving confirmation of the sale of securities and the value of cash received for the sale of securities, payment interchange system 66 sends information to accounting system 60 that causes accounting system 60 to update information in data stores 68 to indicate a deposit the cash equal to the sale of the securities in the payment receiver's account. In some examples, payment interchange system 66 may send one or more messages to financial services 64 to deposit the cash in an account of the payment receiver that exists outside of electronic payment processing system 18. For instance, payment interchange system 66 may use well-known money wire services or automated clearing houses to transfer the cash to accounts that exist outside of electronic payment processing system 18. In any case, accounting system 60 may also update information in data stores 68 to indicate that the securities that were previously sold are no longer titled to the payment receiver. In some cases, payment interchange system 66 allows a payment receiver to hold the donation in the form of securities and later manually convert the securities to cash. Such techniques are further described in FIG. 12.

In some examples, payment interchange system 66 may send one or more notifications to the payment sender and the payment receiver. For instance, payment interchange system 66 may send information using any of various suitable forms of communication, such as email, text message, push notification, etc. Information included in a notification to a computing device of the payment sender may indicate the price of the securities at the time of transfer. The notification may indicate that the transfer was a success and may indicate remaining balance information about the payment sender's accounts. In some examples, the notification may indicate the value of the donation when the securities were received by the payment receiver. That is, the value of the donation may fluctuate based on trading in exchanges while electronic payment processing system 18 is completing the transfer, so the value of the donation when received by the payment receiver may be different than the value of the donation when the transfer was initiated by the payment sender. In some examples, payment interchange system 66 may send such information as described above to a computing device of the payment receiver. In addition, if the payment receiver causes securities to be converted to cash, payment interchange system 66 may send a notification to the computing device of the payment receiver that indicates information including, but not limited to, the value of the securities at the time the conversion was initiated, the value of cash received by the payment sender in exchange for the sale of securities, the updated balance of cash, etc. The type, frequency, triggers, and other parameters associated with such notifications may be configurable by users have accounts with payment interchange system 66.

Figure 3:
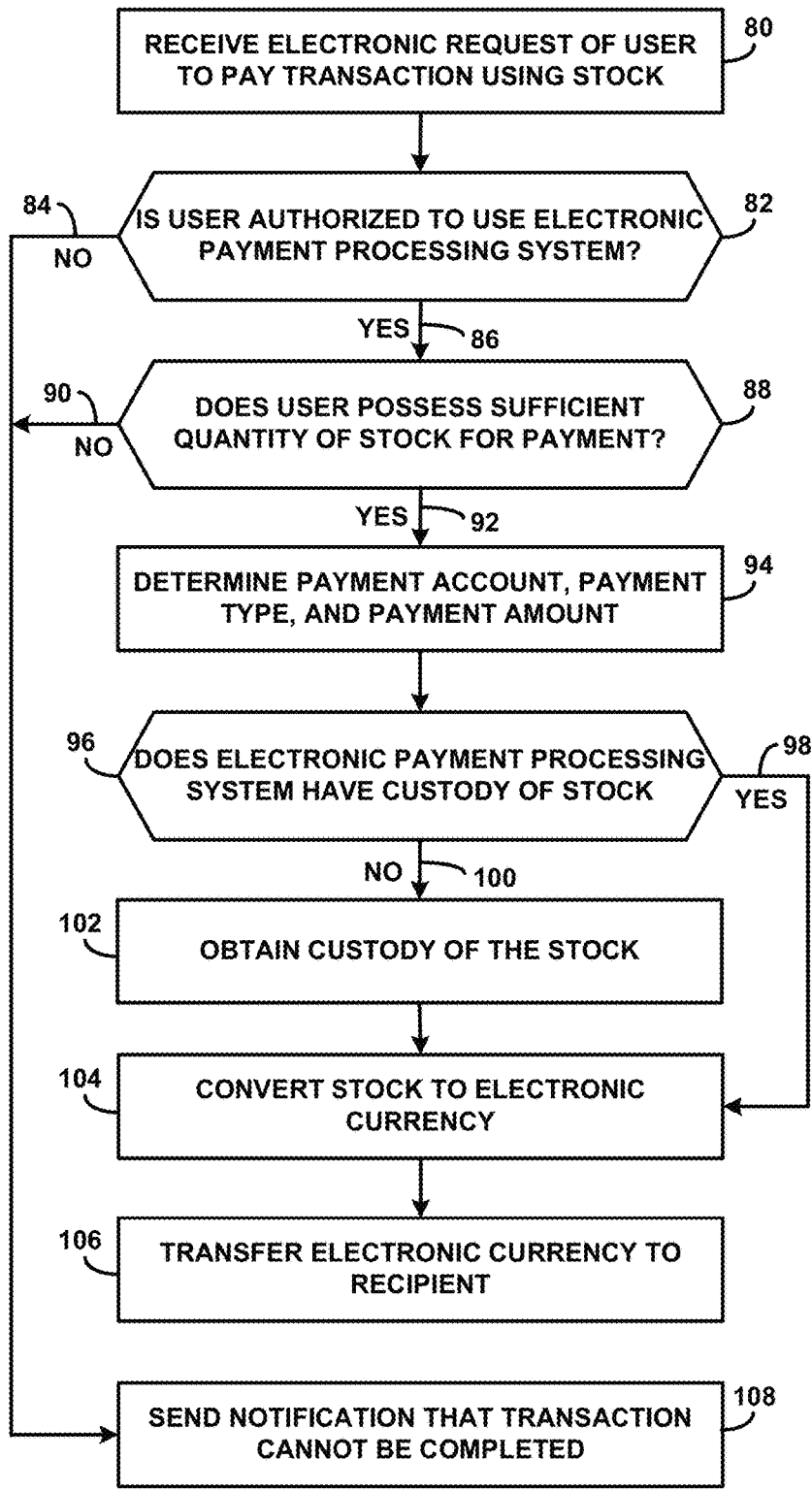
FIG. 3 is a flowchart illustrating example operations of an electronic payment processing system to facilitate payments using securities, in accordance with techniques of this disclosure.

FIG. 3 is a flowchart illustrating example operations of an electronic payment processing system 18 to facilitate payments using securities, in accordance with techniques of this disclosure. The example operations may be performed by electronic payment processing system 18 as described in the examples of FIGS. 1-2.

Initially, electronic payment processing system 18 receives an electronic request from computing device 54 of user 12 to pay for goods and services 23 using stock (80). In response to receiving the request, electronic payment processing system 18 determines whether user 12 is authorized to use electronic payment processing system 18 (82). For instance, electronic payment processing system 18 may establish a secure communication channel with computing device 54. Electronic payment processing system 18 may also use one or more authentication techniques to authenticate user 12. If user 12 is not authenticated (84), electronic payment processing system 18 sends a notification to computing device 54 that the transaction cannot be completed (108). The notification may indicate that user 12 is not authorized to use the system.

In the example of FIG. 3, electronic payment processing system 18 determines whether user 12 is authorized to use electronic payment processing system 18 (86). Electronic payment processing system 18 also determines whether user 12 possesses a sufficient quantity of stock for payment (88). For instance, electronic payment processing system 18 may query one or more financial services 64 and/or accounting system 60 to determine whether user 12 has sufficient stock to complete the payment. If user 12 has insufficient stock (90), electronic payment processing system 18 sends a notification to computing device 54 that the transaction cannot be completed.

If user 12 has a sufficient quantity of stock to complete the payment (92), electronic payment processing system 18 determines the payment account, payment type, and payment amount (88). For instance, electronic payment processing system 18 determines the payment type is stock. Electronic payment processing system 18 further determines the account associated with the stock. In some examples, electronic payment processing system 18 also determines the payment amount, which in some examples, may include a stock price, stock quantity, or product of a stock price and stock quantity.

Using the payment account, type, and payment, electronic payment processing system 18, determines whether electronic payment processing system 18 has custody of the stock (96). For instance, electronic payment processing system 18 may determine whether a legal entity that owns and/or maintains electronic payment processing system 18 has custody of the stock. If electronic payment processing system 18 does not have custody of the stock (100), electronic payment processing system 18 obtains custody by sending a request to securities clearinghouse 62 (102). Upon receiving the stock from securities clearinghouse 62, electronic payment processing system 18 includes the stock in one or more of brokerage accounts 25 that are maintained by electronic payment processing system 18. In some examples, obtaining custody of the stock may further include electronic payment processing system 18 retitling the stock. Alternatively, if electronic payment processing system 18 does have custody of the stock (98), electronic payment processing system 18 proceeds to convert the stock into electronic currency for payment to provider 22.

In some examples, electronic payment processing system 18 converts the stock to electronic currency by selling the stock to a purchaser and receiving cash in the form of electronic currency (104). To perform the sale of the stock, electronic payment processing system 18, sends a request to securities clearinghouse 62, which transfers custody of the stock to a purchaser in exchange for electronic currency. Once electronic payment processing system 18 has received the electronic currency, electronic payment processing system 18 transfers the currency to computing device 52, which is associated with provider 22 (106). For example, electronic payment processing system 18 may transfer the electronic currency to a brokerage account of provider 22 and further notify provider 22 of the transfer.

Figure 4:
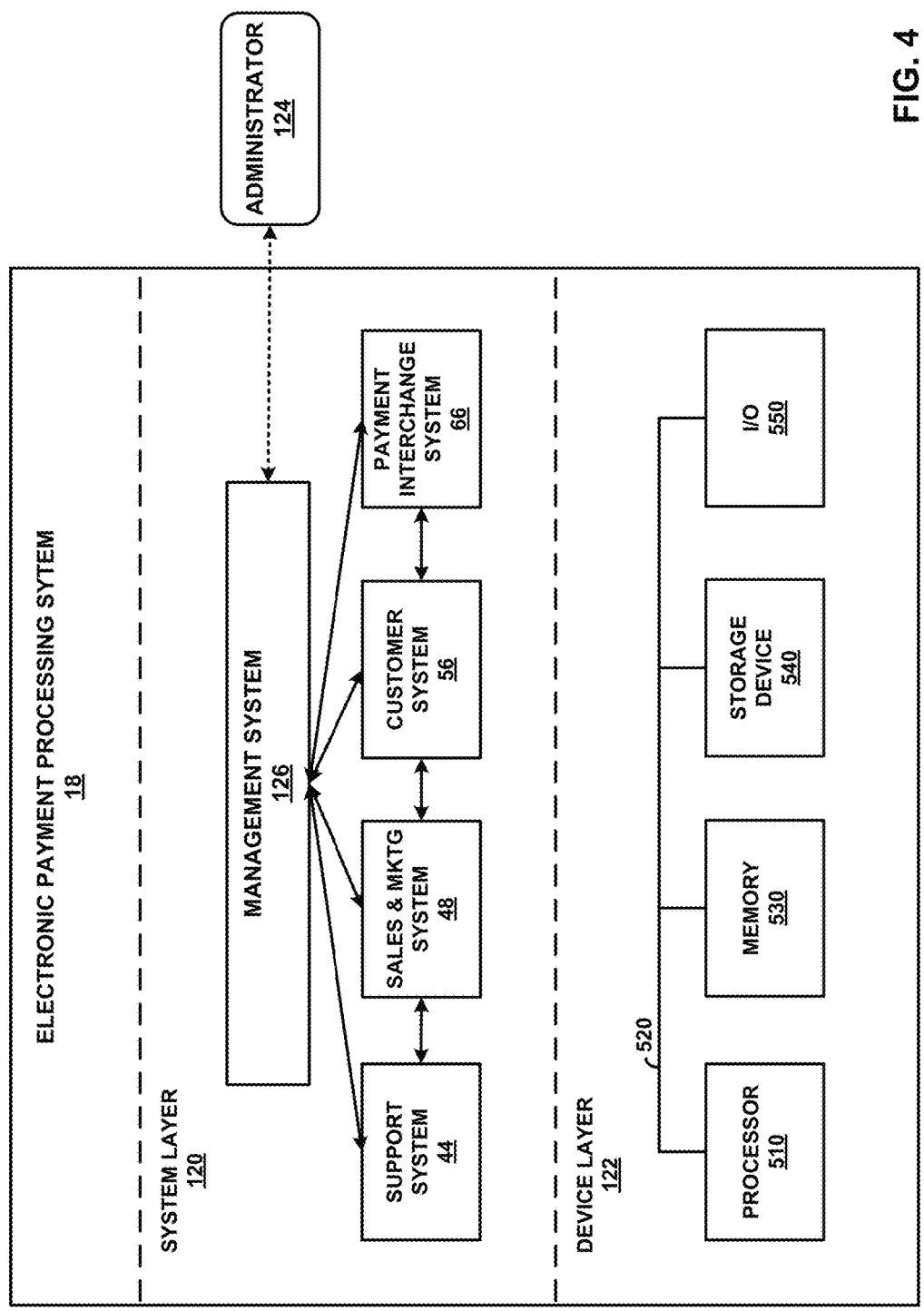
FIG. 4 is a conceptual diagram illustrating further details of an electronic payment processing system, in accordance with one or more techniques of the present disclosure.

FIG. 4 is a conceptual diagram illustrating further details of electronic payment processing system 18, in accordance with one or more techniques of the present disclosure. As shown in FIG. 4, electronic payment processing system 18 further illustrated into logical layers that include system layer 120 and device layer 122. Device layer 122 includes components, such as processor 510, memory 530, storage device 540, and input/output (I/O) elements 550. Components of device layer 122 are coupled by one or more buses 520. In some examples, device layer 122 provides an operating environment for components of system layer 120. Components of device layer 122 are described in further detail in FIG. 5

FIG. 4 also includes system layer 120. System layer 120 may include one or more components that implement techniques of the disclosure. In some examples, the components may be modules and/or applications that perform one or more operations. The components and/or modules may be implemented as software, hardware, and/or a combination of hardware and software. Example components of system layer 120 include management system 126, support system 44, sales & marketing system 48, customer system 56, and payment interchange system 66. In some examples, each of the components of electronic payment processing system 18 may be on a single computing device, such as a server computing device, desktop computing device, etc. In other examples, one or more components of electronic payment processing system 18 may be distributed on separate computing devices. In such examples, the components of system layer 120 may communicate via communication links, such as a TCP/IP network.

In the example of FIG. 4, electronic payment processing system 18 includes a management system 126. In some examples, management system 126 generates for display, a graphical user interface (GUI) that an administrator 124 may interact with to configure and maintain components of electronic payment processing system 18. For instance, a GUI provided by management system 126 may enable administrator 124 to perform one or more administrative functions, such as modifying customer information, manually completing payments, etc. In such examples, administrator 124 may provide user input that causes management system 126 to further communicate with components of system layer 120 to perform operations specified by the user input.

As shown in FIG. 4, components of system layer 120 are stored at memory 530 and storage device 540. Processor 510 performs one or more operations of the components of system layer 120 by executing various instructions of the components. For instance, payment interchange system 66 initially receives an electronic request from a computing device of a user 12 to pay for goods and/or services using stock. The request may include a stock quantity, payment type, and identifier of an account associated with the stock. In response to receiving the request, customer system 56 determines whether the user has access to electronic payment processing system 18.

In the current example, the user 12 has access to use electronic payment processing system 18. Payment interchange system 66 further determines the payment type to be stock. Consequently, payment interchange system 66 determines whether electronic payment processing system 18 has custody of the stock in one or more of brokerage accounts 25. Because electronic payment processing system 18 does not initially have custody of the stock in the example of FIG. 4, payment interchange system 66 sends a request to a securities clearinghouse 62 to request custody of the stock.

Upon receiving custody of the stock, payment interchange system 66 includes the stock in one or more of brokerage accounts 25 associated with user 12. Payment interchange system 66 converts the stock to electronic currency by completing an electronic sale of the stock. In response to completing the electronic sale of the stock, payment interchange system 66 receives electronic currency in return for the sale of stock. Payment interchange system 66 then transfers the payment electronically to a computing device that manages an account associated with the payment recipient.

Figure 5:
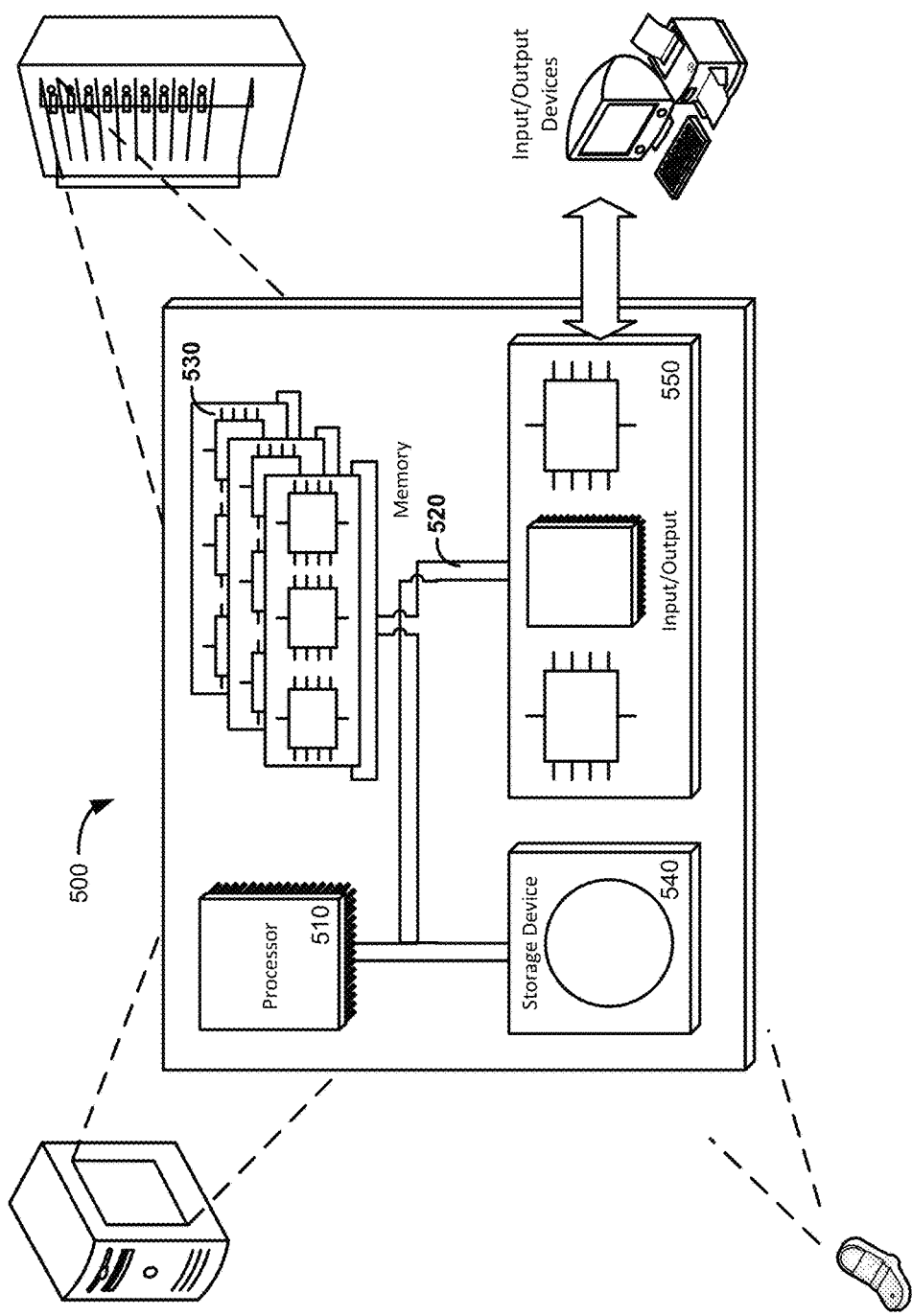
FIG. 5 shows a detailed example of various devices that may be configured to execute program code to practice some embodiments in accordance with the current disclosure.

FIG. 5 shows a detailed example of various devices that may be configured to execute program code to practice some embodiments in accordance with the current disclosure. For example, device 500 may be an electronic payment processing system 18 that facilitates payment for goods and services 23 using stock in accordance with the techniques described herein. In another example, device 500 may be an example of computing device 54 of user 12 as illustrated in FIG. 2. I another example, device 500 may be an example of computing device 52 of provider 22.

In the example illustrated in FIG. 5, a computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such as a printer, video camera, surveillance equipment or the like. Other input-output elements may include wireless communication interfaces such as Bluetooth, Wi-Fi, and cellular data networks.

In one example, an electronic payment processing system includes an interface to receive an electronic payment request for a transaction associated with a provider of goods or services. The electronic payment processing system may include a processor configured to execute program code for processing the payment request with a payment processing system to identify one or more accounts associated with a recipient of the goods or services and to determine whether the identified accounts have sufficient stock assets to satisfy an amount specified by the payment request. In some examples, the program code issues an electronic response message from the payment processing system indicating pending payment for the transaction when the identified account has sufficient stock assets to satisfy the amount specified by the payment request.

In one example, an electronic payment processing system includes means for receiving an electronic payment request for a transaction associated with a provider of goods or services. The electronic payment processing system may also include means for processing the payment request with a payment processing system to identify one or more accounts associated with a recipient of the goods or services and to issue electronic payment for the transaction using stock assets sufficient to satisfy the amount specified by the payment request.

FIG. 6 is a conceptual diagram illustrating a user interface to select a brokerage firm using an aggregation service in accordance with the current disclosure. As previously described, electronic payment processing system 18 may use an aggregation service to retrieve and/or combine information for multiple accounts of user 12 into one or more consolidated views that are displayable in a user interface output by computing device 54 of user 12. For instance, user 12 may initially enroll in electronic payment processing system 18 by creating an account. User 12 may interact through a user interface provided by computing device 54 to provide account information such as name, address, phone number, etc. The user interface may be implemented as, for example, a Hypertext Markup Language document retrieved from electronic payment processing system 18, or may be a user interface of an application executing at computing device 54. In any case, upon enrolling in electronic payment processing system 18, the user interface of computing device 54 may prompt user 12 whether he or she would like to use the aggregation service to display multiple accounts in the user interface. If user 12 provides a user input to decline using the aggregation service, the user interface may change to the user interface as illustrated in FIG. 7, which allows user 12 to choose whether to use securities to make a donation or cash payment.

User 12 may alternatively provide a user input to indicate that user 12 will use the aggregation service. Upon providing the user input, computing device 54 may generate a user interface 600 for display that can collect information for all of the accounts that user 12 would like to aggregate. As described above, user interface 600 generated for display by computing device 54 may be based on information received from electronic payment processing system 18, such as a web page, or may be based on program logic included in application executing at computing device 54, such as a smartphone or desktop application.

FIG. 6 illustrates a user interface 600 output by computing device 54 that enables user 12 to provide user input to select a brokerage firm in order to add the brokerage firm from an aggregation service. As shown in user interface 600 of FIG. 6, computing device 54 may output a drop-down menu 602 or other suitable user interface element that lists each brokerage firm with which user 12 has an account. A user interface element, generally, may be any component of a user interface that can display and/or receive information. A user interface element, in some examples, may be selectable and/or configurable in response to user input. Responsive to such user input the user interface element may store data corresponding to the user interface element and/or initiate one or more operations at a computing device.

In some examples, electronic payment processing system 18 may query an aggregation service, retrieve data for user 12 that indicates each brokerage firm, and send the data to computing device 54, which outputs the brokerage firms. Drop-down menu 602 may include a selectable element for each brokerage firm. For instance, user 12 may provide a user input to select element 604 that corresponds to "Brokerage Firm 1." User 12 may have an account with "Brokerage Firm 1" that includes securities. Upon selecting element 604, computing device 54 may output for display an updated user interface to obtain credentials to access the account of "Brokerage Firm 1."

In some examples, a computing device of a user may output for display, a second user interface that includes a plurality of representations of brokerage firms, wherein each of the brokerage firms includes an account of the user. The computing device may receive a user input to select at least one of the plurality of representations of brokerage firms. The computing device may send to the electronic payment processing system, one or more messages that indicate at least one brokerage firm corresponding to the selected at least one of the plurality of representations of brokerage firms. In some examples, the one or more securities are maintained by the at least one brokerage firm prior to generating the one or more messages that include the information indicating the one or more securities and the at least one of the transfer and the cash payment.

FIG. 7A is a conceptual diagram illustrating a user interface to receive user input authentication credentials using an aggregation service in accordance with the current disclosure. As shown in FIG. 7A, user interface 700 may include a drop-down menu 702. Drop-down menu 702 may include user interface elements 704 and 706. User interface element 704 may include the name of the brokerage firm previously selected by user 12, for example, "Brokerage Firm 1." In addition, user interface 700 may include user interface element 706, which may be an input field. User 12 may provide user input to indicate the username of the user 12 for the account managed by "Brokerage Firm 1." In some examples, upon providing the user input, computing device 54 may output an updated user interface to obtain a password that, in combination with the username, provides access to user 12's account at "Brokerage Firm 1." Although illustrated as drop-down menu 702, user interface 700 may include any suitable user interface elements to receive a username for the account of user 12.

FIG. 7B is a conceptual diagram illustrating a user interface to receive input user authentication credentials using an aggregation service in accordance with the current disclosure. As shown in FIG. 7B, user interface 710 may include a drop-down menu 712. Drop-down menu 712 may include user interface elements 704 and 706. User interface element 714 may include the name of the brokerage firm previously selected by user 12. In addition, user interface 710 may include user interface element 716, which may be an input field. User 12 may provide user input to indicate the password of user 12 that, in combination with the user name, provides access to user 12's account at "Brokerage Firm 1." In some examples, upon providing the user input, computing device 54 may output an updated user interface to elect whether to use securities to make a donation or cash payment. Although illustrated as drop-down menu 712, user interface 710 may include any suitable user interface elements to receive a password for the account of user 12. In addition, computing device 54, in some examples, may present one or more additional user interfaces to receive any other optional or required account information.

FIG. 7C is a conceptual diagram illustrating a user interface to receive a user input that indicates whether to make a donation or cash payment using securities in accordance with the current disclosure. As shown in FIG. 7C, user interface 720 may include one or more button user interface elements 722 and 724. If user 12 wishes to make a donation using securities, user 12 may provide a user input to select button user interface element 722. Alternatively, if user 12 wishes to make a cash payment using securities, user 12 may provide a user input to select button user interface element 724. Upon providing a user input to make a selection of one of button user interface elements 722 and 724, computing device 52 may output an updated user interface to specify the parameters of the transaction. For instance, in the example of FIG. 7C, user 12 may provide a user input to select button user interface element 722. In some examples, a computing device may receive a user input that indicates information comprising at least one of: a donee of the transfer of the one or more securities as the donation, and the provider of goods or services to receive the cash payment based on the sale of the one or more securities; and including, by the computing device, the information indicated by the user input in the one or more messages.

Figure 8:
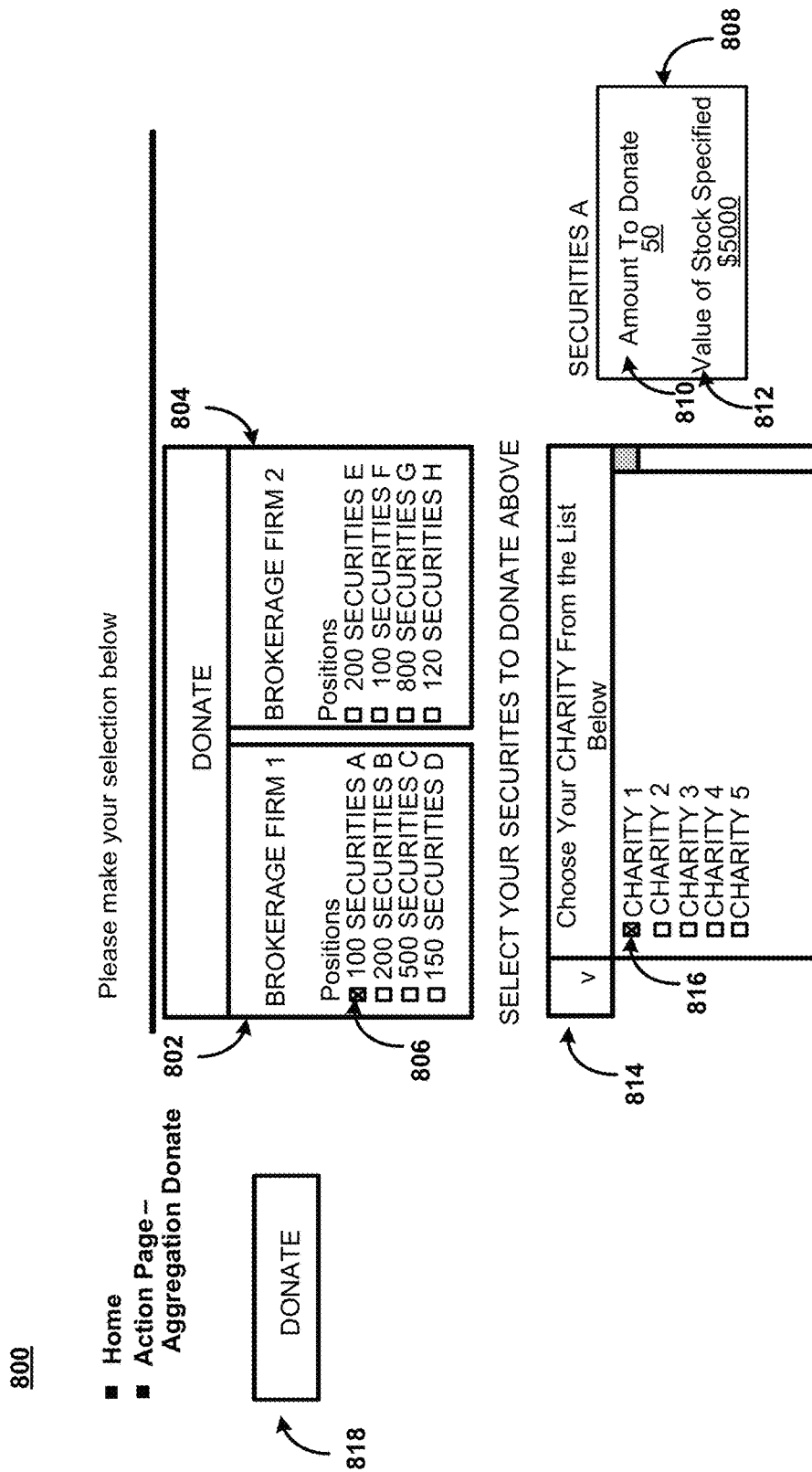
FIG. 8 is a conceptual diagram illustrating a user interface to receive a user input to make a donation using securities in accordance with the current disclosure.

FIG. 8 is a conceptual diagram illustrating a user interface to receive a user input to make a donation using securities in accordance with the current disclosure. In some examples, a computing device may output for display, a user interface that includes one or more user interface elements to receive information that indicate one or more securities and at least one of: a transfer of the one or more securities as a donation, and a cash payment to a provider of goods or services based on a sale of the one or more securities. The computing device may receive information indicating the one or more securities and the at least one of the transfer and the cash payment. The computing device may generate one or more messages that include the information indicating the one or more securities and the at least one of the transfer and the cash payment. The computing device may send to an electronic payment processing system, the one or more messages.

FIG. 8 illustrates a user interface 800 that allows user 12 to provide one or more selections in the form of user inputs to make a donation. As shown in FIG. 8, user interface 800 may include one or more regions that display brokerage firm information for brokerage firms that user 12 configured as part of the aggregation process. For instance, region 802 may list one or more securities included in user 12's account managed by "Brokerage Firm 1." Similarly, region 804 may include one or more securities included in user 12's account managed by "Brokerage Firm 2." As shown in the example of FIG. 8, region 802 may include one or more checkboxes that correspond to securities included in user 12's account. User 12 may provide a user input at user interface 800 to select or "check" checkbox 806. User 12 provides the user input to select checkbox 806 to select the securities associated with checkbox 806 for donation. In some examples, user 12 may provide one or more user inputs to select multiple different securities from one or more of "Brokerage Firm 1" and "Brokerage Firm 2".

For each checkbox selected, user interface 800 may include a user interface element 808. User interface element 808 may allow user 12 to specify the quantity and/or value of the selected securities indicated in region 802 and/or 804. For instance, user interface 800 may include user interface element 808, which corresponds to "SECURITIES A" that user 12 wishes to donated as indicated by selected checkbox 806. User interface element 808 may include an input field 810 or other suitable user interface element that enables user 12 to provide user input that specifies the quantity of "SECURITIES A" to donate. User interface element 808 may include an input field 812 or other suitable user interface element that enables user 12 that specifies the value of "SECURITIES A" to donate. In other words, by specifying a value of the securities, computing device 54 may automatically determine the appropriate number of shares of the securities based on the current value of the securities. In some examples, by inputting a value of one of 810 or 812, the value for the other of 810 and 812 is automatically displayed.

User interface 800 may also include drop-down menu 814 that enables user 12 to provide a user input to select the payment receiver (e.g., donee, charity, etc.). As shown in the example of FIG. 8, dropdown menu 814 may include a list of payment receiver names. Computing device 54 may receive the payment receiver names from electronic payment processing system 18. In some examples, user 12 may configure the payment receivers, while in other examples, one or more of the payment receivers may be automatically configured by electronic payment processing system 18. User 12 may provide a user input to select a checkbox associated with the desired payment receiver, e.g., "CHARITY 1", in FIG. 8. Upon selecting the checkbox corresponding to the payment receiver, user 12 may provide a user input to select user interface element button 818 included in user interface 800. In some examples, upon receiving user input to select user interface element button 818, computing device 54 may output for display a prompt to confirm whether the user wishes to perform the transaction. In some examples, user interface 800 may also include one or more user interface elements and/or receive an indication of one or more accounts within a brokerage firm that the user wishes to select the securities. In some examples, user interface 800 may also include one or more balances of securities (e.g., in value and/or quantity form) in a respective brokerage firm or account of a brokerage firm.

Responsive to determining that user 12 has provided a user input to select user interface element button 818, computing device 54 may determine the user inputs previously provided by user 12 in user interface 800. For instance, computing device 54 determines that "50" shares worth "$5000" of "SECURITIES A" that are managed by "BROKERAGE FIRM 1" shall be donated to "CHARITY 1". Computing device 54 will generate one or more messages that indicate information that specifies the transfer of securities as a donation as indicated by user 12's selection in user interface 800 of FIG. 8. In particular, because user 12 has indicated the transfer will be a donation, computing device 54 may send one or more messages to electronic payment processing system that indicate the transfer is a donation. As described herein, electronic payment processing system may receive the one or more messages and perform the transfer of securities to the payment receiver as a donation based on the information of the one or more messages, in accordance with techniques of the disclosure.

In this way, user interface 800 of FIG. 8 may enable a user to select a payment receiver (e.g., charity, donee, etc), the brokerage firm that currently includes the securities, and the securities to donate. User interface 800 may enable a user to indicate how many shares of the securities to donate or a dollar amount that computes the approximate number of shares required for the donation. User interface 800 may also output an estimated tax benefit to the user at various tax bracket levels.

In some examples, user interface 800 may include one or more user interface elements that receive user input from a user to make a donation using multiple sources of funding. For instance, user 12 may fund 50% of a donation with stock and 50% of the donation with an alternative payment source.

Alternative payment sources may include savings accounts, checking accounts, credit cards, other securities from the same or different brokerage, or any other suitable source of funding. Furthermore, any combination of one or more funding sources may be used with differing or the same proportions of funds being donated from each source. User 12 can provider user input at user interface 800 to add and/or specify the information for each funding source, quantity and/or value of funding source, and/or any other suitable information to make the donation using multiple sources of funding.

Figure 9:
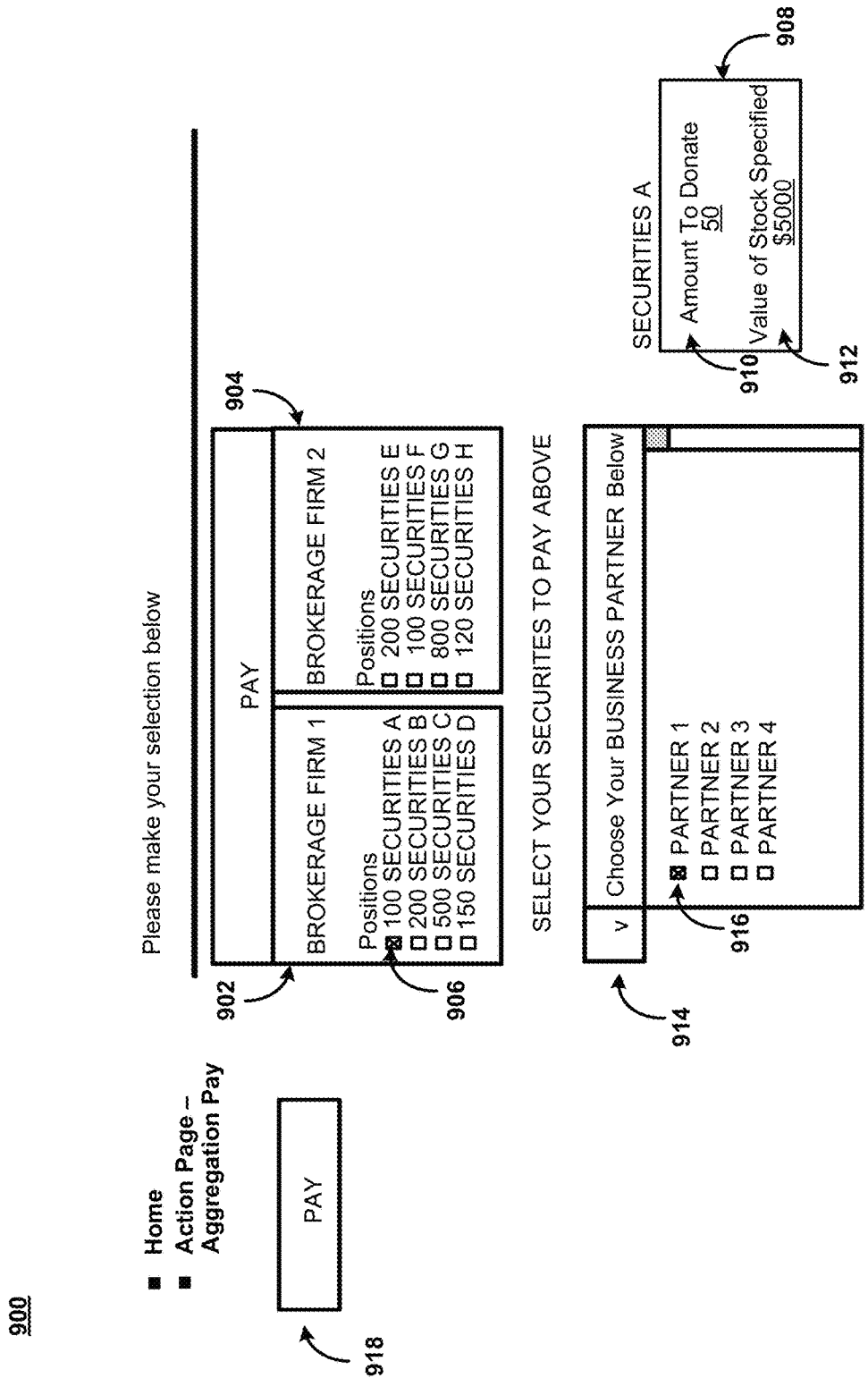
FIG. 9 is a conceptual diagram illustrating a user interface to receive a user input to make a cash payment using securities in accordance with the current disclosure.

FIG. 9 is a conceptual diagram illustrating a user interface to receive a user input to make a cash payment using securities in accordance with the current disclosure. FIG. 9 illustrates a user interface 900 that allows user 12 to provide one or more selections in the form of user inputs to make a donation. As shown in FIG. 9, user interface 900 may include one or more regions that display brokerage firm information for brokerage firms that user 12 configured as part of the aggregation process. For instance, region 902 may list one or more securities included in user 12's account managed by "Brokerage Firm 1." Similarly, region 904 may include one or more securities included in user 12's account managed by "Brokerage Firm 2." As shown in the example of FIG. 9, region 902 may include one or more checkboxes that correspond to securities included in user 12's account. User 12 may provide a user input at user interface 900 to select or "check" checkbox 906. User 12 provides the user input to select checkbox 906 to select the securities associated with checkbox 906 for the cash payment. In some examples, user 12 may provide one or more user inputs to select multiple different securities from one or more of "Brokerage Firm 1" and "Brokerage Firm 2".

For each checkbox selected, user interface 900 may include a user interface element 908. User interface element 908 may allow user 12 to specify the quantity and/or value of the selected securities indicated in region 902 and/or 904. For instance, user interface 900 may include user interface element 908, which corresponds to "SECURITIES A" that user 12 wishes convert to cash to make a cash payment as indicated by selected checkbox 906. User interface element 908 may include an input field 910 or other suitable user interface element that enables user 12 to provide user input that specifies the quantity of "SECURITIES A" to sell in order to make the cash payment. User interface element 908 may include an input field 912 or other suitable user interface element that enables user 12 that specifies the value of "SECURITIES A" to sell in order to make the cash payment. In other words, by specifying a value of the securities, computing device 54 may automatically determine the appropriate number of shares of the securities based on the current value of the securities. In some examples, by inputting a value of one of 910 or 912, the value for the other of 910 and 912 is automatically displayed.

User interface 900 may also include drop-down menu 914 that enables user 12 to provide a user input to select the payment receiver (e.g., business partner, retail store, etc.). As shown in the example of FIG. 9, dropdown menu 914 may include a list of payment receiver names. Computing device 54 may receive the payment receiver names from electronic payment processing system 18. In some examples, user 12 may configure the payment receivers, while in other examples, one or more of the payment receivers may be automatically configured by electronic payment processing system 18. User 12 may provide a user input to select a checkbox associated with the desired payment receiver, e.g., "PARTNER 1", in FIG. 9. Upon selecting the checkbox corresponding to the payment receiver, user 12 may provide a user input to select user interface element button 918 included in user interface 900.

In some examples, user interface 900 may also include one or more user interface elements and/or receive an indication of one or more accounts within a brokerage firm that the user wishes to select the securities. In some examples, user interface 900 may also include one or more balances of securities (e.g., in value and/or quantity form) in a respective brokerage firm or account of a brokerage firm. In some examples, upon receiving user input to select user interface element button 918, computing device 54 may output for display a prompt to confirm whether the user wishes to perform the transaction.

Responsive to determining that user 12 has provided a user input to select user interface element button 918, computing device 54 may determine the user inputs previously provided by user 12 in user interface 900. For instance, computing device 54 determines that "50" shares worth "$5000" of "SECURITIES A" that are managed by "BROKERAGE FIRM 1" shall be converted to cash and deposited in an account associated with "PARTNER 1". Computing device 54 will generate one or more messages that indicate information that specifies the conversion of securities to make a cash payment as indicated by user 12's selection in user interface 900 of FIG. 9. In particular, because user 12 has indicated the transaction will be a cash payment, computing device 54 may send one or more messages to electronic payment processing system 18 that indicates the transfer as cash payment. As described herein, electronic payment processing system may receive the one or more messages and perform the conversion of securities to cash based on the information of the one or more messages, in accordance with techniques of the disclosure.

User interface 900 may enable a user to indicate how many shares of the securities to convert in the cash payment or a dollar amount that computes the approximate number of shares required for the cash payment. In some examples, user interface 900 may include one or more user interface elements that receive user input from a user to make payment using securities with multiple sources of funding. For instance, user 12 may fund 50% of cash payment with stock and 50% of the donation with an alternative payment source. Alternative payment sources may include savings accounts, checking accounts, other securities from the same or different brokerage, or any other suitable source of funding. Furthermore, any combination of one or more funding sources may be used with differing or the same proportions of funds from each source. User 12 can provider user input at user interface 900 to add and/or specify the information for each funding source, quantity and/or value of funding source, and/or any other suitable information to make the cash payment using multiple sources of funding.

Figure 10:
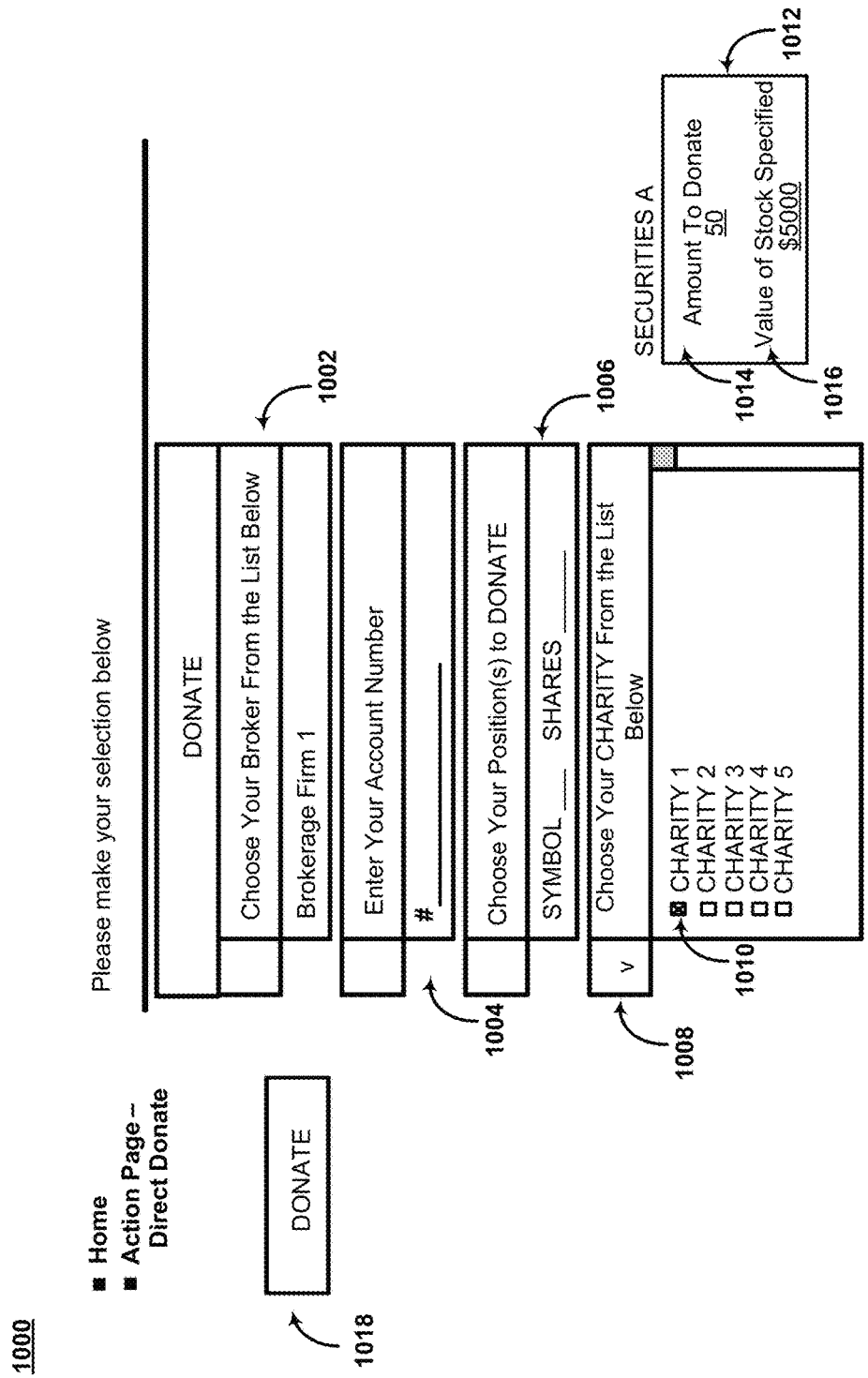
FIG. 10 is a conceptual diagram illustrating a user interface to receive a user input to make a direct donation using securities in accordance with the current disclosure.

FIG. 10 is a conceptual diagram illustrating a user interface to receive a user input to make a direct donation using securities in accordance with the current disclosure. As shown in FIG. 10, user interface 1000 allows user 12 to make a direct donation of securities. That is, user interface 1000 enables user 12 to directly provide alphanumeric input or any other suitable direct form of input values, to specify the parameters of the donation of securities. For instance, as shown in FIG. 10, user interface 1000 may include dropdown menu 1002. In other examples, dropdown menu 1002 may also be any other suitable user interface element for displaying and selecting one or more input values. Drop-down menu 1002 may display one or more brokerage firms that based on information user 12 previously configured using an aggregation service. In the example of FIG. 10, user 12 may provide a user input to select "Brokerage Firm 1." "Brokerage Firm 1" may include one or more accounts associated with user 12 that includes one or more securities.

User interface 1000 may also include input field 1004 to receive an account number that identifies that account of user 12 including securities that user 12 wishes to donate. Although shown as an input field, input field 1004 may be any suitable user interface element for receiving user input. In some examples, user 12 may select input field 1004 and provide user input by typing and/or gesturing at a keyboard, providing voice input, or any other suitable form of providing user input. FIG. 10 also includes input field 1006. Input field 1006 may allow user 12 to provide user input to specify an identifier or symbol of the security to be donated and the number of shares to be donated. Any suitable user interface element may be used to receive the user input.

In some examples, user interface 1000 may also include dropdown menu 1008. Dropdown menu 1008 may allow user 12 to provide user input to select a payment receiver of the securities as a donation (e.g., a charity, donee, etc.). As shown in FIG. 10, dropdown menu 1008 may list one or more user interface elements 1010 that user 12 may select by providing user input. User 12, for example, provides a user input to select user interface element 1010, which is illustrated as a checkbox in the current example. That is, user 12 has provided user input to indicate that the donation of securities shall be made to "CHARITY 1."

User interface 1000 may include a user interface element 1012. User interface element 1012 may display the quantity and/or value of the selected securities indicated in user interface element 1006. For instance, user interface 1000 may include user interface element 1012, which corresponds to the identifier (e.g., symbol) of the security that user 12 wishes to donate as indicated in user interface element 1006. User interface element 1012 may display the quantity 1014 of the securities to donate and the value 1016 of the securities to donate. In other words, by specifying the identifier and shares in user interface element 1006, computing device 54 may automatically determine the value (e.g., cost-basis) of the securities based on the indicated number of shares.

Upon providing the various information to the user interface elements of user interface 1000, user 12 may provide a user input to select user interface element button 1018 included in user interface 1000. Responsive to determining that user 12 has provided a user input to select user interface element button 1018, computing device 54 may determine the user inputs previously provided by user 12 in user interface 1000. For instance, computing device 54 determines that the brokerage firm, account number, identifier of securities, quantity of securities, and payment receiver to perform the transfer of securities. Computing device 54 may generate one or more messages that indicate information that specifies the transfer of securities as a donation as indicated by user 12's selection in user interface 1000 of FIG. 10. In particular, because user 12 has indicated the transfer will be a donation, computing device 54 may send one or more messages to electronic payment processing system that indicate the transfer is a donation. As described herein, electronic payment processing system may receive the one or more messages and perform the transfer of securities to the payment receiver as a donation based on the information of the one or more messages, in accordance with techniques of the disclosure.

User interface 1000 may enable a user to indicate how many shares of the securities to donate or a dollar amount that computes the approximate number of shares required for the donation. User interface 1000 may also output an estimated tax benefit to the user at various tax bracket levels. In some examples, user interface 1000 may include one or more user interface elements that receive user input from a user to make a donation using multiple sources of funding. For instance, user 12 may fund 50% of a donation with stock and 50% of the donation with an alternative payment source. Alternative payment sources may include savings accounts, checking accounts, other securities from the same or different brokerage, or any other suitable source of funding. Furthermore, any combination of one or more funding sources may be used with differing or the same proportions of funds being donated from each source. User 12 can provide user input at user interface 1000 to add and/or specify the information for each funding source, quantity and/or value of funding source, and/or any other suitable information to make the donation using multiple sources of funding.

Figure 11:
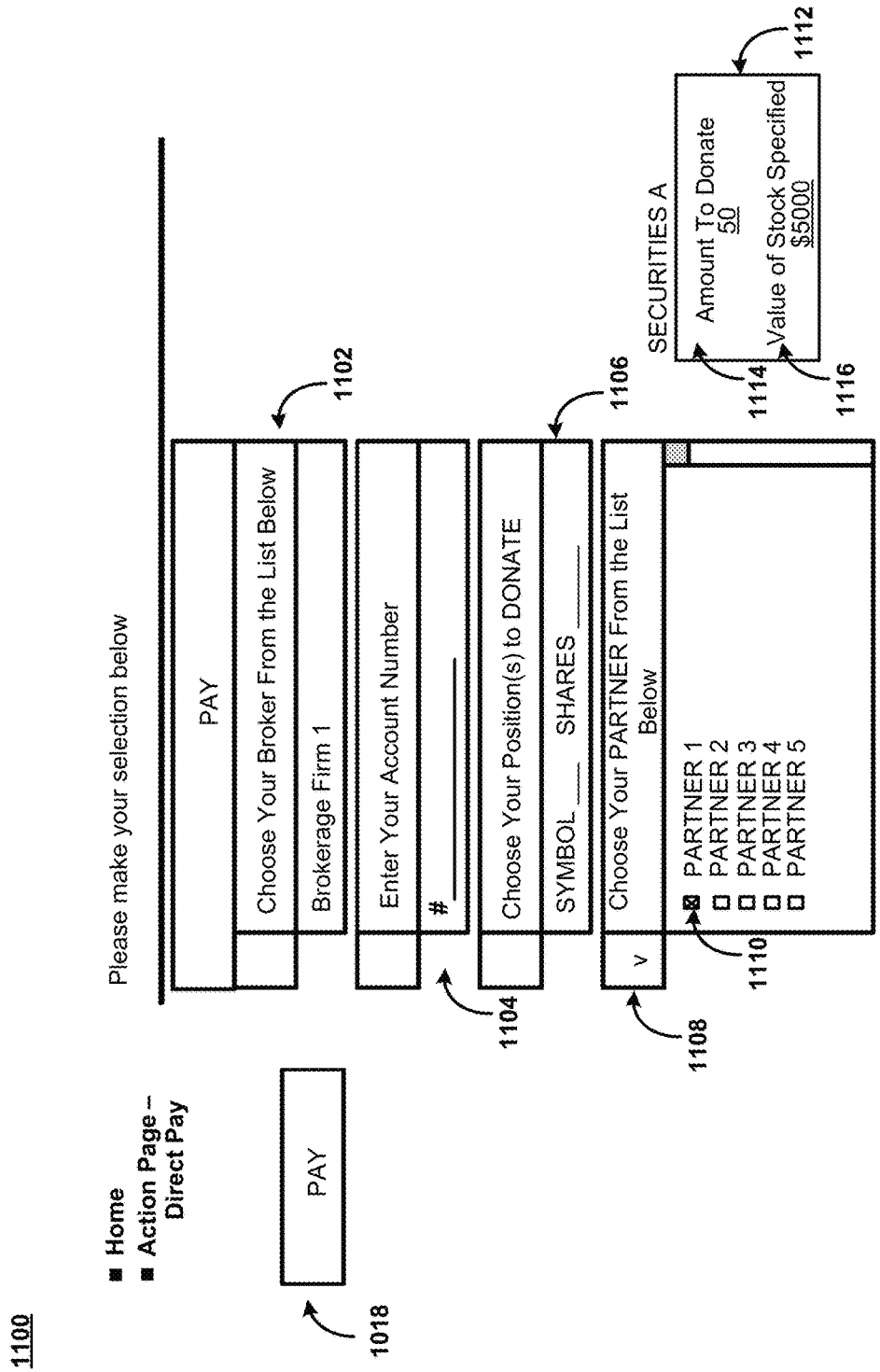
FIG. 11 is a conceptual diagram illustrating a user interface to receive a user input to make a direct cash payment using securities in accordance with the current disclosure.

FIG. 11 is a conceptual diagram illustrating a user interface to receive a user input to make a direct cash payment using securities in accordance with the current disclosure. As shown in FIG. 11, user interface 1100 allows user 12 to make a direct cash payment using securities. That is, user interface 1100 enables user 12 to directly provide alphanumeric input or any other suitable direct form of input values, to specify the parameters of a conversion of securities to cash in order to make a cash payment. For instance, as shown in FIG. 11, user interface 1100 may include dropdown menu 1102. In other examples, dropdown menu 1102 may also be any other suitable user interface element for displaying and selecting one or more input values. Dropdown menu 1102 may display one or more brokerage firms that based on information user 12 previously configured using an aggregation service. In the example of FIG. 11, user 12 may provide a user input to select "Brokerage Firm 1." "Brokerage Firm 1" may include one or more accounts associated with user 12 that includes one or more securities.

User interface 1100 may also include input field 1104 to receive an account number that identifies that account of user 12 including securities that user 12 wishes to convert to cash in order to make a cash payment. Although shown as an input field, input field 1104 may be any suitable user interface element for receiving user input. In some examples, user 12 may select input field 1104 and provide user input by typing and/or gesturing at a keyboard, providing voice input, or any other suitable form of providing user input. FIG. 11 also includes input field 1106. Input field 1106 may allow user 12 to provide user input to specify an identifier or symbol of the security to be donated and the number of shares to convert to cash to make the cash payment. Any suitable user interface element may be used to receive the user input.

In some examples, user interface 1100 may also include dropdown menu 1108. Dropdown menu 1108 may allow user 12 to provide user input to select a payment receiver of the cash proceeds from the sale of securities. As shown in FIG. 11, dropdown menu 1108 may list one or more user interface elements 1110 that user 12 may select by providing user input. User 12, for example, provides a user input to select user interface element 1110, which is illustrated as a checkbox in the current example. That is, user 12 has provided user input to indicate that the cash from the sale of securities shall be made to "PARTNER 1."

User interface 1100 may include a user interface element 1112. User interface element 1112 may display the quantity and/or value of the selected securities indicated in user interface element 1106. For instance, user interface 1100 may include user interface element 1112, which corresponds to the identifier (e.g., symbol) of the security that user 12 wishes to donate as indicated in user interface element 1106. User interface element 1112 may display the quantity 1114 of the securities to donate and the value 1116 of the securities to donate. In other words, by specifying the identifier and shares in user interface element 1106, computing device 54 may automatically determine the value of the securities based on the indicated number of shares.

Upon providing the various information to the user interface elements of user interface 1100, user 12 may provide a user input to select user interface element button 1018 included in user interface 1100. In some examples, upon receiving user input to select user interface element button 1018, computing device 54 may output for display a prompt to confirm whether the user wishes to perform the transaction. In some examples, user interface 1000 may also include one or more user interface elements and/or receive an indication of one or more accounts within a brokerage firm that the user wishes to select the securities.

Responsive to determining that user 12 has provided a user input to select user interface element button 1018, computing device 54 may determine the user inputs previously provided by user 12 in user interface 1100. For instance, computing device 54 determines that the brokerage firm, account number, identifier of securities, quantity of securities, and payment receiver to perform the transfer of securities. Computing device 54 will generate one or more messages that indicate information that specifies the conversion of securities to cash as indicated by user 12's selection in user interface 1100 of FIG. 11. In particular, because user 12 has indicated the transaction will be a conversion of securities to cash, computing device 54 may send one or more messages to electronic payment processing system that indicate the transfer is conversion of securities to cash. Electronic payment processing system 18 may receive the one or more messages and perform the conversion of securities to cash. The cash may be transferred to an account of the payment receiver based on the information of the one or more messages received from computing device 54, in accordance with techniques of the disclosure.

User interface 1100 may enable a user to indicate how many shares of the securities to convert in the cash payment or a dollar amount that computes the approximate number of shares required for the cash payment. In some examples, user interface 1100 may include one or more user interface elements that receive user input from a user to make payment using securities with multiple sources of funding. For instance, user 12 may fund 50% of cash payment with stock and 50% of the donation with an alternative payment source. Alternative payment sources may include savings accounts, checking accounts, other securities from the same or different brokerage, or any other suitable source of funding. Furthermore, any combination of one or more funding sources may be used with differing or the same proportions of funds from each source. User 12 can provider user input at user interface 1100 to add and/or specify the information for each funding source, quantity and/or value of funding source, and/or any other suitable information to make the cash payment using multiple sources of funding.

Figure 12:
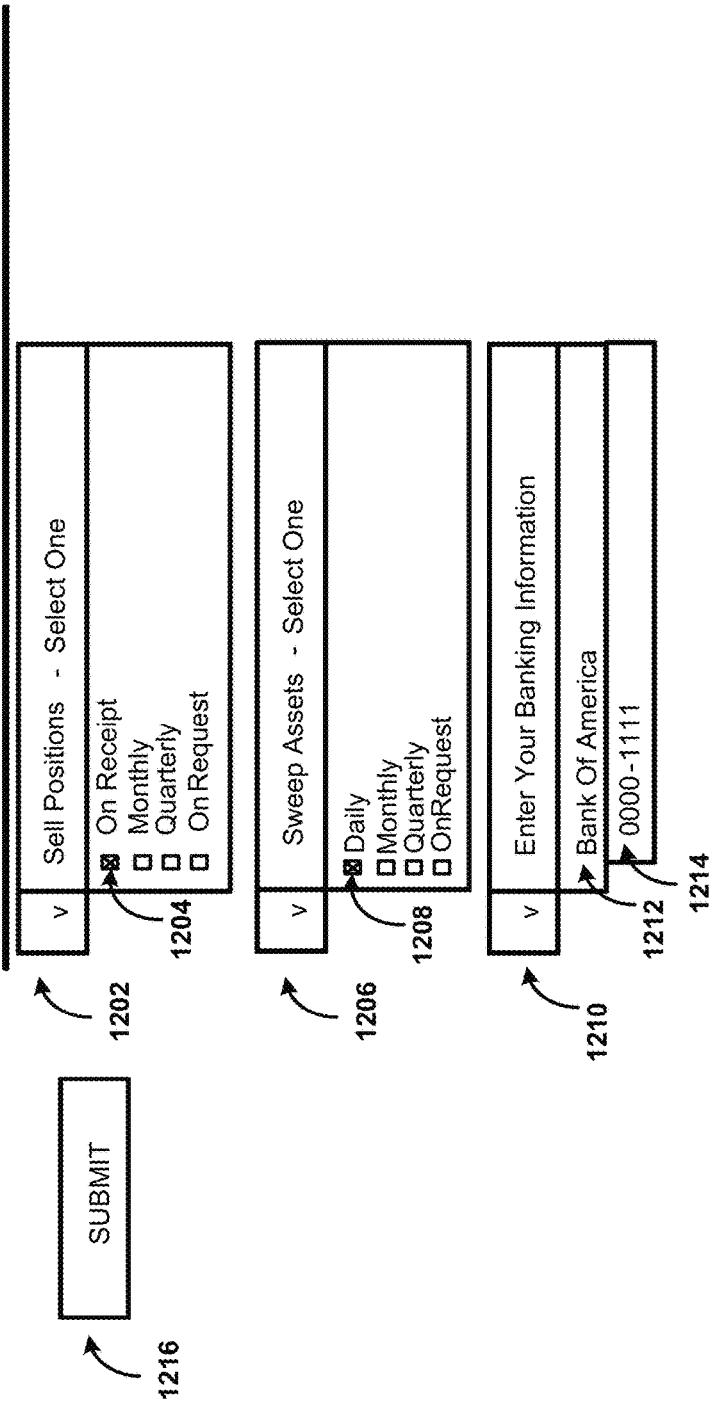
FIG. 12 is a conceptual diagram illustrating a user interface for a payment receiver to manage donations of securities in accordance with the current disclosure.

FIG. 12 is a conceptual diagram illustrating a user interface for a payment receiver to manage donations of securities in accordance with the current disclosure. User interface 1200 enables a payment receiver (e.g., provider 22 in FIG. 2) that receives a donation of securities to take various actions with respect to the donation. For instance, the payment receiver wish for donations of securities to be automatically converted by electronic payment processing system 18 to cash based on one or more conditions or business rules. In this way, user interface 1200 enables the payment receiver to configure electronic payment processing system 18 to automatically perform one or more transfer and/or conversion actions on donated securities. Thus, in one example, a computing device may output for display, one or more user interface elements to receive information that indicates a condition that when satisfied causes the electronic payment processing system to convert of securities to cash. The computing device may receive a user input that specifies the condition that when satisfied causes the electronic payment processing system to convert of securities to cash. The computing device may generate one or more messages that include the information indicating the securities and specifying the condition; and send to the electronic payment processing system, the one or more messages.

In the example of FIG. 12, user interface 1200 may include dropdown menu 1202. Dropdown menu 1202 may include one or more sell position options, such as represented by user interface element 1204. For example, the payment receiver may provide a user input to indicate that electronic payment processing system 18 shall convert donations to cash (e.g., sold) upon receipt of the securities in the payment receiver's account, as indicated by selected checkbox 1204. In other examples, the payment receiver may specify that electronic payment processing system 18 shall convert the securities to cash on a monthly, quarterly, or other user-defined interval. In still other examples, the payment receiver may specify that electronic payment processing system 18 shall convert the securities to cash upon further user input (e.g., upon further request) provided by the payment receiver.

User interface 1200 may include dropdown menu 1204. Dropdown menu 1204 may include one or more sweep options, such as represented by user interface element 1208. For example, the payment receiver may provide a user input to indicate that electronic payment processing system 18 shall sweep cash generated from a conversion of securities into an account of the payment receiver. As shown in FIG. 12, the payment receiver specifies that electronic payment processing system 18 shall sweep such cash into a specified account of the payment receiver's on a daily basis, as indicated by selected checkbox 1208. In other examples, the payment receiver may specify that electronic payment processing system 18 shall sweep the cash on a monthly, quarterly, or other user-defined interval. In still other examples, the payment receiver may specify that electronic payment processing system 18 shall sweep the cash upon further user input (e.g., upon further request) provided by the payment receiver. Thus, in one example, a computing device may output for display, one or more user interface elements to receive information that indicates a condition that when satisfied causes the electronic payment processing system transfer cash from a first account to a second account. The computing device may receive a user input that specifies the condition that when satisfied causes the electronic payment processing system to transfer the cash from the first account to the second account. The computing device may generate one or more messages that include the information indicating the securities and specifying the condition. The computing device may send to the electronic payment processing system, the one or more messages.

User interface 1200 may also include dropdown menu 1210. Dropdown menu 1210 allows the payment receiver to specify the banking information for the account into which the cash from a conversion may be deposited, or the account into which the cash may be swept into. As shown in FIG. 12, the payment receiver may select a configured financial institution into which the cash will be transferred, as indicated by user interface element 1212. In other examples, user interface 1200 may allow the payment receiver to provide user input that includes alphanumeric values that specify the payment receiver (e.g., text). User interface 1200 may also display a user interface element 1214 that specifies an account number of the account associated with the financial institution into which the cash shall be deposited. In some examples, the payment receiver may select an account from a group of pre-configured accounts associated with the payment receiver and managed by the financial institution specified in user interface element 1212. In other examples, user interface element 1214 may be one or more input fields in which the payment receiver may provide user input that includes alphanumeric values that specify the account information (e.g., text). In some examples, user interface 1200 may include a user interface element button 1216. Upon receiving user input to select user interface element button 1216, the computing device of the payment receiver may send one or more messages indicating the information of user interface 1200 as provided by the user inputs to electronic payment processing system 18.

In one example, a computing device may output for display, a user interface that includes one or more user interface elements to receive information that indicates one or more securities received as a donation. The computing device may receive a user input that specifies a conversion of at least a portion of the one or more securities received as the donation to cash. The computing device may generate one or more messages that include the information indicating the one or more securities and specifying the conversion of at least the portion of the one or more securities received as the donation to cash. The computing device may send to an electronic payment processing system, the one or more messages.

In some examples, an electronic payment processing system may send one or more notifications to a computing device to notify the user of the computing device that securities have been converted to cash. A computing device may receive from the electronic payment processing system, a message that including information that indicates the conversion of at least the portion of the one or more securities received as the donation to cash has completed and outputting a notification based at least in on the information included in the message.

Figure 13:
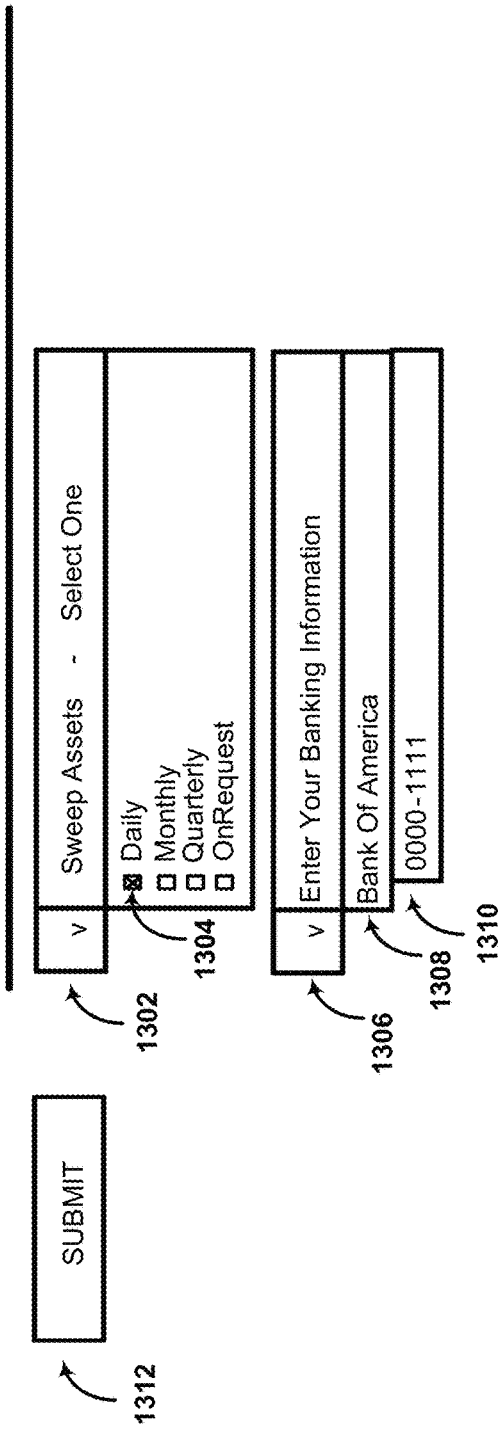
FIG. 13 is a conceptual diagram illustrating a user interface for a payment receiver to manage cash received as payment from the conversion of securities in accordance with the current disclosure.

FIG. 13 is a conceptual diagram illustrating a user interface for a payment receiver to manage cash received as payment from the conversion of securities in accordance with the current disclosure. User interface 1300 enables a payment receiver (e.g., provider 22 in FIG. 2) that receives cash from a sale of securities provided as payment by a payment sender to take various actions.

User interface 1300 may include dropdown menu 1302. Dropdown menu 1302 may include one or more sweep options, such as represented by user interface element 1300. For example, the payment receiver may provide a user input to indicate that electronic payment processing system 18 shall sweep cash that was converted from securities provided as payment into an account of the payment receiver. As shown in FIG. 13, the payment receiver specifies that electronic payment processing system 18 shall sweep such cash into a specified account of the payment receiver's on a daily basis, as indicated by selected checkbox 1304. In other examples, the payment receiver may specify that electronic payment processing system 18 shall sweep the cash on a monthly, quarterly, or other user-defined interval. In still other examples, the payment receiver may specify that electronic payment processing system 18 shall sweep the cash upon further user input (e.g., upon further request) provided by the payment receiver.

User interface 1300 may also include dropdown menu 1306. Dropdown menu 1306 allows the payment receiver to specify the banking information for the account into which the cash from a conversion of securities provided for payment may be deposited, or the account into which the cash may be swept into. As shown in FIG. 13, the payment receiver may select a configured financial institution into which the cash will be transferred, as indicated by user interface element 1308. In other examples, user interface 1300 may allow the payment receiver to provide user input that includes alphanumeric values that specify the payment receiver (e.g., text). User interface 1300 may also display a user interface element 1310 that specifies an account number of the account associated with the financial institution into which the cash shall be deposited. In some examples, the payment receiver may select an account from a group of pre-configured accounts associated with the payment receiver and managed by the financial institution specified in user interface element 1308. In other examples, user interface element 1310 may be one or more input fields in which the payment receiver may provide user input that includes alphanumeric values that specify the account information (e.g., text). In some examples, user interface 1300 may include a user interface element button 1312. Upon receiving user input to select user interface element button 1312, the computing device of the payment receiver may send one or more messages indicating the information of user interface 1300 as provided by the user inputs to electronic payment processing system 18.

Figure 14:
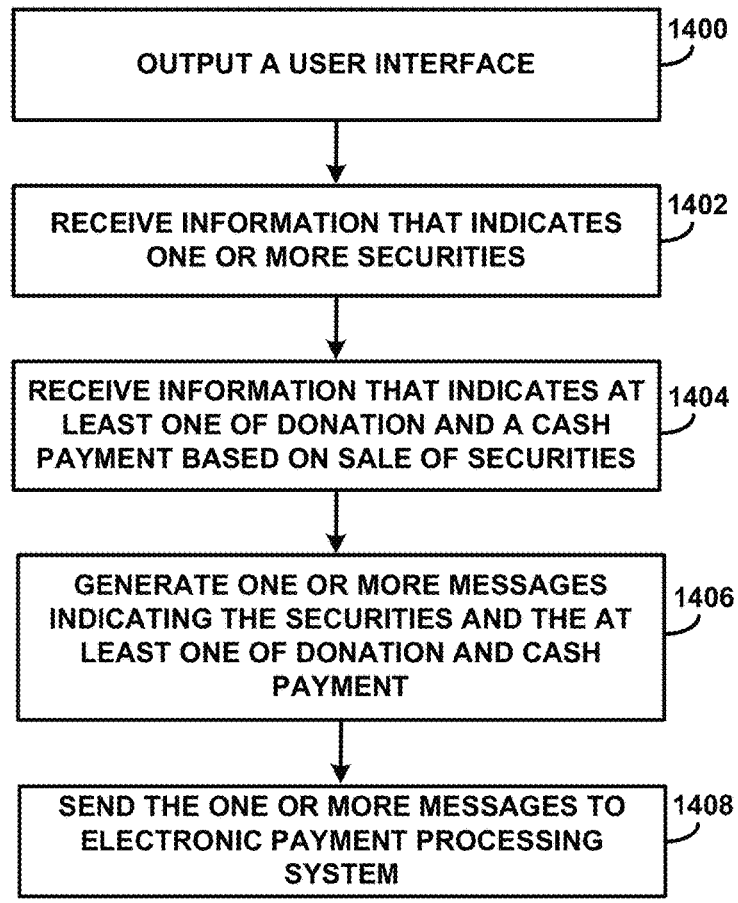
FIG. 14 is a flow diagram illustrating example operations of a computing device to provide user interface that allows a user make a donation using securities or make a cash payment resulting from a sale of securities, in accordance with one or more aspects of the present disclosure.

FIG. 14 is a flow diagram illustrating example operations of a computing device to provide user interface that allows a user make a donation using securities or make a cash payment resulting from a sale of securities, in accordance with one or more aspects of the present disclosure. For purposes of illustration only, the example operations are described below within the context of computing device 54, as shown in FIG. 2. As shown in FIG. 14, computing device 54 may initially output a user interface (1400). The user interface that includes one or more user interface elements to receive information that indicate one or more securities. The user interface may also include user elements to receive information that indicate at least one of: a transfer of the one or more securities as a donation, and a cash payment to a provider of goods or services based on a sale of the one or more securities.

Computing device 54 may receive information that indicates the one or more securities (1402). For instance the information may include stock ticker symbols or other suitable identifiers of securities. Computing device 54 may receive information that indicates the at least one of the transfer and the cash payment (1404). That is, the information may indicate that the transaction to perform at electronic payment processing system 18 is a transfer of securities as a donation or a cash payment based on the automatic sale of securities.

Based on the information received from the user in the form of user inputs for the various user interface elements, computing device 54 may generate one or more messages that include the information indicating the one or more securities and the at least one of the transfer and the cash payment (1406). Computing device 54 may then send the one or more messages to electronic payment processing system 18 (1408). Electronic payment processing 18 may receive the one or more messages and, based on the information of the one or more messages, perform a donation of securities or perform a payment of cash resulting from a sale of the securities indicated in the one or more messages, as described in this disclosure.

Figure 15:
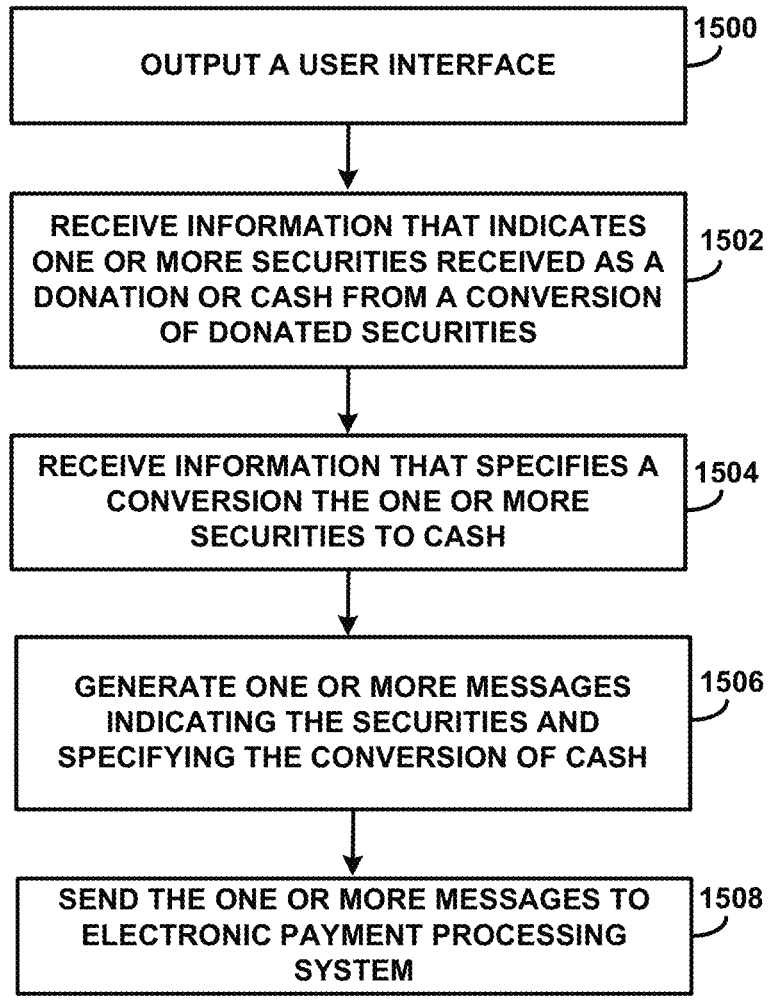
FIG. 15 is a flow diagram illustrating example operations of a computing device to provide user interface that allows a payment receiver to manage a donation using securities or a cash payment resulting from a sale of securities, in accordance with one or more aspects of the present disclosure.

FIG. 15 is a flow diagram illustrating example operations of a computing device to provide user interface that allows a payment receiver to manage a donation using securities or a cash payment resulting from a sale of securities, in accordance with one or more aspects of the present disclosure. For purposes of illustration only, the example operations are described below within the context of computing device 52, as shown in FIG. 2. As shown in FIG. 15, computing device 52 may initially output a user interface (1500). The user interface that includes one or more user interface elements to receive information that indicates one or more securities received as a donation or cash from a conversion of donated securities. The user interface may also include user interface elements to receive information that specifies a conversion of at least a portion of the one or more securities received as the donation to cash. The user interface may also include user interface elements to receive other information corresponding to the conversion of the one or more securities.

Computing device 52 may receive information indicating the one or more securities (1502). For instance the information may include stock ticker symbols or other suitable identifiers of securities. Computing device 52 may receive information that indicates the at least one of the transfer and the cash payment (1504). Example information may include, the destination account for cash resulting from the sale of securities and any other suitable information for performing the conversion.

Based on the information received from the user in the form of user inputs for the various user interface elements, computing device 52 may generate one or more messages that include the information indicating the one or more securities and specifying the conversion of at least the portion of the one or more securities received as the donation to cash (1506). Computing device 52 may then send the one or more messages to electronic payment processing system 18 (1508). Electronic payment processing 18 may receive the one or more messages and, based on the information of the one or more messages, perform a conversion of the securities to cash, as described in this disclosure.

As illustrated in the examples of FIGS. 12-13 and 15, a computing device 52 may output a user interface that allows a payment receiver to elect whether to automatically convert the donated securities to cash in response to one or more conditions (e.g., on request, daily, monthly, etc.) or to hold the securities in the payment receiver's securities account without automatically converting the securities to cash. For instance, computing device 52 may receive information from a payment receive to aggregate transactions on a daily, monthly, or other time interval, and computing device 52 may send such information to electronic payment processing system 18. Electronic payment processing system 18 may perform such aggregated transactions in accordance with the information indicated in the information received from computing device 52. In the examples of automatically converting securities to cash, computing device 52 may send information to electronic payment processing system 18 that causes system 18 to automatically convert the securities to cash. Electronic payment processing system 18 may hold the cash in an account on electronic payment processing system 18 in some examples. In other examples, electronic payment processing system 18 may transfer the cash to an external accounting using a transfer server, such as the Automated Clearing House (ACH) transfer system or a wire transfer system.

In some examples, computing device 52 may provide a user interface to receive user input that causes electronic payment processing system 18 to issue acknowledgement letters. Computing device 52 may send information to electronic payment processing system 18 that corresponds to the user input. Electronic payment processing system 18 may send the acknowledge letters in electronic form (e.g., email, markup language document, text message, etc.) or automatically by postal mail. Acknowledgement letters may indicate the purpose, amount, securities, donee (e.g., charity, payment receiver, etc.), donor, and any other suitable information that may be used for tax reporting purposes. Computing device 52 may send information corresponding to the user input to electronic payment processing system 18, which upon receiving the information may be configured to issue acknowledgement letters to the donor upon processing a donation.

In some examples, computing device 52 may provide a user interface to receive information that causes electronic payment processing system 18 to hold cash received as a cash payment resulting from a sale of securities in an account on electronic payment processing system 18. In other examples, electronic payment processing system 18 may transfer the cash received as a cash payment resulting from a sale of securities to an external accounting using a transfer server, such as the Automated Clearing House (ACH) transfer system or a wire transfer system. Computing device 52 may provide a user interface to receive information from a payment receiver to aggregate transactions on a daily, monthly, or other time interval, and computing device 52 may send such information to electronic payment processing system 18. Electronic payment processing system 18 may perform such aggregated transactions in accordance with the information indicated in the information received from computing device 52.

In some examples, computing devices 52 and/or 54 may respective generate user interfaces for display that historical information about past transactions. For instance, the user interfaces may output individual transaction details or groups of transactions in an aggregated manner. In some examples, the information for a transaction may include the price at the time the donation of securities was initiated and/or the price at the time the securities were actually sold in exchange for cash. A transaction, generally, may be a transfer of securities as a donation or a cash payment based on the proceeds of a sale of securities. In some examples, data for the past transactions may be visualized in graphs, charts, etc. Although various examples of displaying historical information about past transactions have been discussed herein, any other suitable visualizations and displays of information may be used by computing devices 52, 54 and/or electronic payment processing system 18 to display such information.

Figure 16:
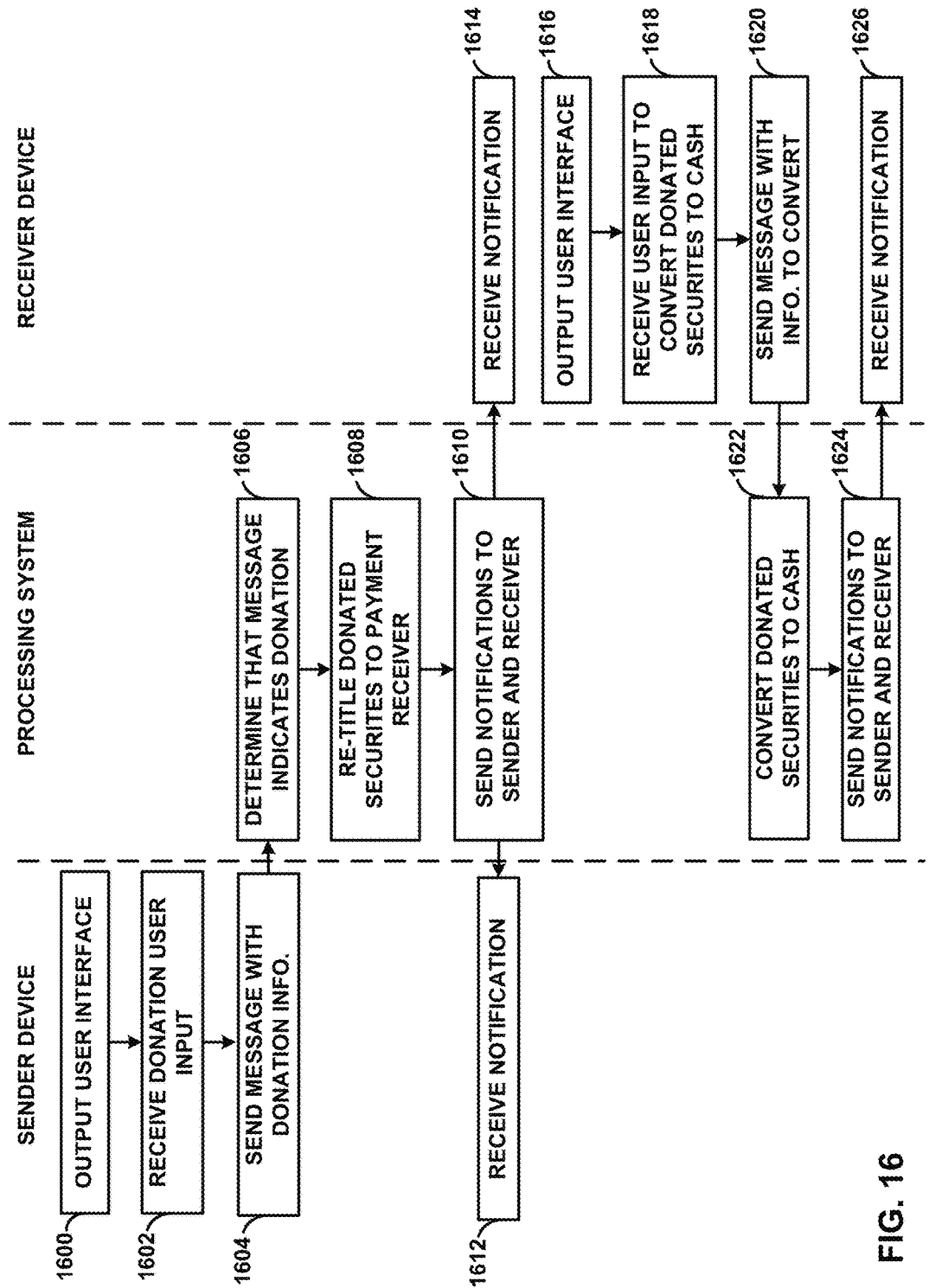
FIG. 16 is a flowchart illustrating example operations of an electronic payment processing system that transfers securities as a donation from a payment sender to a payment receiver, in accordance with the current disclosure.

FIG. 16 is a flowchart illustrating example operations of an electronic payment processing system that transfers securities as a donation from a sender (e.g., a donor) to a receiver (e.g., a charity), in accordance with the current disclosure. Example operations in accordance with techniques of the disclosure are illustrated for example purposes with respect to computing device 54 of user 12 (e.g., sender), electronic payment processing system 18, and a user of computing device 52 (e.g., receiver) as illustrated in FIG. 2.

As shown in the example of FIG. 16, the sender device (e.g., computing device 54) may initially output for display a user interface that enables the sender to provide one or more user inputs to specify a donation of securities (1600). For instance, the sender may provide user input at the sender device to indicate a brokerage firm, account that includes the securities, identifier of one or more securities to donate, one or more quantities of securities to donate, the receiver of the securities (e.g., donee, charity, etc.), and an indication that the transfer is a donation of securities. The sender device may receive the one or more user inputs (1602), and send a message with information corresponding to the user inputs to the payment processing system (1604).

The payment processing system may receive the message and determine that the message indicates the transfer of securities is for a donation (1606). Because the payment processing system has determined that the transfer is a donation, the payment processing system retitles the donated securities to the receiver as described in FIG. 2 (1608). Upon retitling the donated securities from the sender to the receiver, the payment processing system may send notifications to the sender device and/or the receiver device (1610). As shown in FIG. 16, the sender device may receive the notification (1612), and in some examples may output the notification. Similarly, the receiver device may receive the notification (1614), and in some examples may output the notification. In some examples, the notification may include information that indicates one or more of whether the transfer of securities as a donation was successful, the value of the securities at the time the transfer was initiated, and the value of the securities at the time the transfer was completed. Thus, in some examples, a computing device may receive from the electronic payment processing system, a message comprising information that indicates: the transfer of the one or more securities as the donation has completed, and the cash payment to the provider of goods or services based on the sale of the one or more securities has completed. The computing device may output a notification based at least in on the information included in the message.

In the example of FIG. 16, the receiver may wish to convert the donated securities to cash. In some examples, the computing device of the receiver may output a user interface that allows the receiver to provide user inputs to convert the donated securities to cash (1616). The receiver may interact with the user interface to specify the information used to convert the securities to cash. For instance, the receiver may specify the securities from one or more accounts of the receiver. The receiver may also provide user input to indicate the quantity and/or value of the securities to be converted to cash. The receiver may also provide user input to indicate an account of the receiver that will be deposited with the cash proceeds from the sale of the securities. In this way, the computing device of the receiver may receive input to convert the donated securities to cash (1618). Although example types of user input have been described, the receiver may specify any other suitable information required and/or optionally requested by the user interface to facilitate the transfer. The computing device of the receiver may then send one or more messages with the information specified by the user as user input to convert the donated securities to cash.

The payment processing system may receive the one or more messages from the computing device of the receiver. Responsive to receiving the one or more messages, the electronic payment processing may convert the donated securities to cash as described in this disclosure (1622). For instance, the payment processing system may determine that the one or more messages indicate the conversion of donated securities to cash. The payment processing system may therefore automatically sell the securities and deposit the cash proceeds into the account of the receiver as specified by the one or more messages received from the computing device of the receiver. Upon completing the conversion of donated securities to cash, the payment processing system may send a notification to the computing device of the receiver (1624). As shown in FIG. 16, the receiver device may receive the notification (1626), and in some examples may output the notification. In some examples, the notification may include information that indicates one or more of whether the conversion of donated securities to cash was successful, the value of the securities at the time the conversion was initiated, and the value of the securities at the time the conversion was completed.

In one example, system for donating securities may include a donor computing device of a donor (e.g., a sender); a donee computing device of a donee (e.g., a receiver); and an electronic payment processing system. The donor computing device may output for display, a first user interface that includes one or more user interface elements to receive information that indicates one or more securities of the donor and specifies a transfer of the one or more securities as a donation. Responsive to receiving one or more user inputs that indicate the information for the one or more user interface elements, the donor computing device may send one or more messages to the electronic payment processing system that includes the information indicating the one or more securities and specifying the transfer of the one or more securities as the donation. Responsive to receiving the one or more messages, the electronic payment processing system may automatically retitle the one or more securities of the donor to the donee. The donee computing device may output for display, a second user interface that includes one or more user interface elements to receive information that indicates the one or more securities received as the donation. The donee computing device may receive a user input that defines a conversion of at least a portion of the one or more securities received as the donation to cash. Responsive to receiving the user input, the donee computing device may send one or more messages to the electronic payment processing system that include the information indicating the one or more securities and the conversion of at least the portion of the one or more securities received as the donation to cash. Responsive to receiving the one or more messages, the electronic payment processing system may automatically convert the one or more securities to cash.

In one example, a system for provisioning a cash payment using securities may include a payment sender computing device of a payment sender. The system may include a payment receiver computing device of a payment receiver and an electronic payment processing system. The payment sender computing device may output for display, a first user interface that includes one or more user interface elements to receive information that indicates one or more securities of the payment sender and specifies a cash payment to the payment receiver based on a sale of the one or more securities. Responsive to receiving one or more user inputs that indicate the information for the one or more user interface elements, the payment sender computing device may send one or more messages to the electronic payment processing system that include the information indicating the one or more securities and the cash payment to the payment receiver based on from the sale of the one or more securities. Responsive to receiving the one or more messages, the electronic payment processing system may automatically converts the one or more securities of the payment sender to cash and deposits the cash in an account of the payment receiver. The payment receiver computing device may output for display, a second user interface that includes information indicating the cash in the account of the payment receiver resulting from the sale of the one or more securities.

A computing device comprising at least one processor, wherein the at least one processor is configured to: output for display, a user interface that includes one or more user interface elements to receive information that indicate one or more securities and at least one of: a transfer of the one or more securities as a donation, and a cash payment to a provider of goods or services based on a sale of the one or more securities; receive information indicating the one or more securities and the at least one of the transfer and the cash payment; generate one or more messages that include the information indicating the one or more securities and the at least one of the transfer and the cash payment; and send to an electronic payment processing system, the one or more messages.

A computer-readable storage medium encoded with instructions that, when executed, cause at least one processor to: output for display, a user interface that includes one or more user interface elements to receive information that indicate one or more securities and at least one of: a transfer of the one or more securities as a donation, and a cash payment to a provider of goods or services based on a sale of the one or more securities; receive information indicating the one or more securities and the at least one of the transfer and the cash payment; generate one or more messages that include the information indicating the one or more securities and the at least one of the transfer and the cash payment; and send to an electronic payment processing system, the one or more messages.

A method comprising: outputting, by a computing device and for display, a user interface that includes one or more user interface elements to receive information that indicates one or more securities received as a donation; receiving, by the computing device, a user input that specifies a conversion of at least a portion of the one or more securities received as the donation to cash; generating, by the computing device, one or more messages that include the information indicating the one or more securities and specifying the conversion of at least the portion of the one or more securities received as the donation to cash; and sending, by the computing device and to an electronic payment processing system, the one or more messages.

The method further comprising: outputting, by the computing device and for display, one or more user interface elements to receive information that indicates a condition that when satisfied causes the electronic payment processing system to convert of securities to cash; receiving, by the computing device, a user input that specifies the condition that when satisfied causes the electronic payment processing system to convert of securities to cash; generating, by the computing device, one or more messages that include the information indicating the securities and specifying the condition; and sending, by the computing device and to the electronic payment processing system, the one or more messages.

The method, further comprising: outputting, by the computing device and for display, one or more user interface elements to receive information that indicates a condition that when satisfied causes the electronic payment processing system transfer cash from a first account to a second account; receiving, by the computing device, a user input that specifies the condition that when satisfied causes the electronic payment processing system to transfer the cash from the first account to the second account; generating, by the computing device, one or more messages that include the information indicating the securities and specifying the condition; and sending, by the computing device and to the electronic payment processing system, the one or more messages.

The method, further comprising: receiving, by the computing device and from the electronic payment processing system, a message comprising information that indicates the conversion of at least the portion of the one or more securities received as the donation to cash has completed; and outputting, by the computing device, a notification based at least in on the information included in the message.

A computing device comprising at least one processor, wherein the at least one processor is configured to: output for display, a user interface that includes one or more user interface elements to receive information that indicates one or more securities received as a donation; receive a user input that specifies a conversion of at least a portion of the one or more securities received as the donation to cash; generate one or more messages that include the information indicating the one or more securities and specifying the conversion of at least the portion of the one or more securities received as the donation to cash; and send to an electronic payment processing system, the one or more messages.

A computer-readable storage medium encoded with instructions that, when executed, cause at least one processor to: output for display, a user interface that includes one or more user interface elements to receive information that indicates one or more securities received as a donation; receive a user input that specifies a conversion of at least a portion of the one or more securities received as the donation to cash; generate one or more messages that include the information indicating the one or more securities and specifying the conversion of at least the portion of the one or more securities received as the donation to cash; and send to an electronic payment processing system, the one or more messages.

A computing device comprising at least one processor, wherein the at least one processor is configured to: receive, from a second computing device of a user, data indicating an electronic request for a debit instrument; process the data indicating an electronic request for a debit instrument to access a data store of a data storage device to identify one or more accounts associated with the user and to determine whether the identified accounts have a sufficient amount of securities to satisfy an amount specified by the request; and when the identified account has a sufficient amount of securities to satisfy the amount specified by the request, automatically generate the debit instrument with a redemption value based on the amount specified in the electronic request.

A computer-readable storage medium encoded with instructions that, when executed, cause at least one processor to: receive, from a second computing device of a user, data indicating an electronic request for a debit instrument; process the data indicating an electronic request for a debit instrument to access a data store of a data storage device to identify one or more accounts associated with the user and to determine whether the identified accounts have a sufficient amount of securities to satisfy an amount specified by the request; and when the identified account has a sufficient amount of securities to satisfy the amount specified by the request, automatically generate the debit instrument with a redemption value based on the amount specified in the electronic request.

An electronic payment processing system comprising: an interface to receive an electronic payment request for a transaction associated with a provider of goods or services; and a processor configured to execute program code for processing the payment request with a payment processing system to identify one or more accounts associated with a recipient of the goods or services and to determine whether the identified accounts have a sufficient amount of securities to satisfy an amount specified by the payment request, wherein the program code issues an electronic response message from the payment processing system indicating pending payment for the transaction when the identified account has a sufficient amount of securities to satisfy the amount specified by the payment request.

An electronic payment processing system comprising: means for receiving an electronic payment request for a transaction associated with a provider of goods or services; and means for processing the payment request with a payment processing system to identify one or more accounts associated with a recipient of the goods or services and to issue electronic payment for the transaction using securities sufficient to satisfy the amount specified by the payment request.

A system for donating securities comprising: a donor computing device of a donor; a donee computing device of a donee; an electronic payment processing system; and wherein the donor computing device outputs for display, a first user interface that includes one or more user interface elements to receive information that indicates one or more securities of the donor and specifies a transfer of the one or more securities as a donation; wherein responsive to receiving one or more user inputs that indicate the information for the one or more user interface elements, the donor computing device sends one or more messages to the electronic payment processing system that includes the information indicating the one or more securities and specifying the transfer of the one or more securities as the donation; wherein responsive to receiving the one or more messages, the electronic payment processing system automatically retitles the one or more securities of the donor to the donee; wherein the donee computing device outputs for display, a second user interface that includes one or more user interface elements to receive information that indicates the one or more securities received as the donation; wherein the donee computing device receives a user input that defines a conversion of at least a portion of the one or more securities received as the donation to cash; wherein responsive to receiving the user input, the donee computing device sends one or more messages to the electronic payment processing system that include the information indicating the one or more securities and the conversion of at least the portion of the one or more securities received as the donation to cash; and wherein responsive to receiving the one or more messages, the electronic payment processing system automatically converts the one or more securities to cash.

A system for provisioning a cash payment using securities comprising: a payment sender computing device of a payment sender; a payment receiver computing device of a payment receiver; an electronic payment processing system; and wherein the payment sender computing device outputs for display, a first user interface that includes one or more user interface elements to receive information that indicates one or more securities of the payment sender and specifies a cash payment to the payment receiver based on a sale of the one or more securities; wherein responsive to receiving one or more user inputs that indicate the information for the one or more user interface elements, the payment sender computing device sends one or more messages to the electronic payment processing system that include the information indicating the one or more securities and the cash payment to the payment receiver based on from the sale of the one or more securities; wherein responsive to receiving the one or more messages, the electronic payment processing system automatically converts the one or more securities of the payment sender to cash and deposits the cash in an account of the payment receiver; wherein the payment receiver computing device outputs for display, a second user interface that includes information indicating the cash in the account of the payment receiver resulting from the sale of the one or more securities.

A computing device comprising at least one processor, wherein the at least one processor is configured to: receive data indicating an electronic request for donation of securities to a charity by a donor; process the data indicating the electronic payment request to access a data store of a data storage device to identify one or more accounts associated with a donor and to determine whether the identified accounts have a sufficient amount of securities to satisfy an amount specified by the electronic payment request; and when the identified account has a sufficient amount of securities to satisfy the amount specified by the electronic payment request, automatically generate an electronic response message from the electronic payment processing system to the charity indicating pending payment of the donation.

A computer-readable storage medium encoded with instructions that, when executed, cause at least one processor to: receive data indicating an electronic request for donation of securities to a charity by a donor; process the data indicating the electronic payment request to access a data store of a data storage device to identify one or more accounts associated with a donor and to determine whether the identified accounts have a sufficient amount of securities to satisfy an amount specified by the electronic payment request; and when the identified account has a sufficient amount of securities to satisfy the amount specified by the electronic payment request, automatically generate an electronic response message from the electronic payment processing system to the charity indicating pending payment of the donation.

A computing device comprising at least one processor, wherein the at least one processor is configured to: receive data indicating an electronic payment request for a transaction associated with a provider of goods or services; process the payment request with a payment processing system to access a data store of a data storage device to identify one or more accounts associated with a recipient of the goods or services and to determine whether the identified accounts have a sufficient amount of securities to satisfy an amount specified by the electronic payment request; and when the identified account has a sufficient amount of securities to satisfy the amount specified by the payment request, automatically generate an electronic response message from the payment processing system indicating pending payment for the transaction.

A computer-readable storage medium encoded with instructions that, when executed, cause at least one processor to: receive data indicating an electronic payment request for a transaction associated with a provider of goods or services; process the payment request with a payment processing system to access a data store of a data storage device to identify one or more accounts associated with a recipient of the goods or services and to determine whether the identified accounts have a sufficient amount of securities to satisfy an amount specified by the electronic payment request; and when the identified account has a sufficient amount of securities to satisfy the amount specified by the payment request, automatically generate an electronic response message from the payment processing system indicating pending payment for the transaction.

A method comprising: receiving, with at least one processor of an electronic payment processing system and from a computing device of a user, data indicating an electronic request for a debit instrument; processing the data indicating an electronic request for a debit instrument, with at least one processor of the electronic payment processing system, to access a data store of a data storage device to identify one or more accounts associated with the user and to determine whether the identified accounts have a sufficient amount of securities to satisfy an amount specified by the request; and when the identified account has a sufficient amount of securities to satisfy the amount specified by the request, automatically generating, with the at least one processor of the electronic payment processing system, the debit instrument with a redemption value based on the amount specified in the electronic request.

The method, wherein generating the debit instrument comprises generating, with the at least one processor of the electronic payment processing system, an electronic debit instrument that can be redeemed at one or more providers of goods or services. The method of claim 18, further comprising: outputting, with the at least one processor of the electronic payment processing system, one or more electronic messages from the electronic payment processing system to direct transfer of at least a portion of the securities from the one or more accounts to a receiving account to satisfy the amount specified by the request.

The method, further comprising: outputting, with the at least one processor of the electronic payment processing system, one or more electronic messages from the electronic payment processing system to direct the sale of at least a portion of the securities from the one or more accounts to a receiving account to satisfy the amount specified by the request.

Although this disclosure has provided one or more examples relating to stock or other particular types of securities, the techniques may also apply generally any market securities, including bonds, REITs (real estate investment trust), ETF (exchange-traded fund), mutual fund, etc. In various examples, a computer itself may be a traditional personal computer, a rack-mount or business computer or server as shown or any other type of computerized system. The computer in a further example may include fewer than or more than all elements listed above, such as a thin client or mobile device or tablet computer having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for operating an electronic payment processing system that permits a user to purchase or lease a good or service using one or more securities in one or more securities accounts associated with the user and maintained by one or more brokerage firms, the method comprising:
    receiving, with the electronic payment processing system, data indicating an electronic payment request for the user to pay an amount for a purchase or lease of the good or service from a seller or service provider that is not one of the one or more brokerage firms;
    in response to receiving the data indicating the electronic payment request:

accessing, with the electronic payment processing system, a data storage device to identify the one or more securities accounts associated with the user, and
generating a user interface configured, in any order:
to display a first representation of the one or more brokerage firms, and to allow the user to input a first selection of the displayed first representation of the one or more brokerage firms;
to display a second representation of the one or more securities accounts, and to allow the user to input a second selection of the displayed second representation of the one or more securities accounts associated with the one or more brokerage firms; and
to display a third representation of the one or more securities, and to allow the user to input a third selection of the displayed third representation of the one or more securities associated with the one or more securities accounts;
receiving data indicating:
the first selection of the selected one or more brokerage firms,
the second selection of the selected one or more securities accounts, and
the third selection of the selected one or more securities, by the user on the user interface;
determining, with the electronic payment processing system, that the selected one or more securities have a sufficient value to satisfy the amount specified by the electronic payment request; and
in response to a determination that the selected one or more securities have a sufficient value to satisfy the amount specified by the electronic payment request, generating, with the electronic payment processing system, one or more first electronic messages that direct a transfer or a sale of at least a portion of the selected one or more securities from the selected one or more securities accounts to a receiving securities account to satisfy the amount specified by the electronic payment request.

2. The method of claim 1, wherein:
the one or more first electronic messages direct the transfer, not the sale, of the portion of the selected one or more securities from the selected one or more securities accounts to the receiving securities account, and
generating the one or more first electronic messages comprises outputting, with the electronic payment processing system, the one or more first electronic messages.

3. The method of claim 1, further comprising:
after the transfer of the portion of the selected one or more securities to the receiving securities account, performing, with the electronic payment processing system, an electronic transfer of a dollar amount to the seller or service provider to satisfy payment of the amount specified by the electronic payment request.

4. The method of claim 1, further comprising:
before the transfer of the portion of the selected one or more securities to the receiving securities account, performing, with the electronic payment processing system, an electronic transfer of a dollar amount to the seller or service provider to satisfy payment of the amount specified by the electronic payment request.

5. The method of claim 1, wherein:
the one or more first electronic messages direct the sale, not the transfer, of the portion of the selected one or more securities from the selected one or more securities accounts to the receiving securities account, and
generating the one or more first electronic messages comprises outputting, with the electronic payment processing system, the one or more first electronic messages.

6. The method of claim 5, further comprising:
after the sale of the portion of the selected one or more securities, performing, with the electronic payment processing system, an electronic transfer of a dollar amount to the seller or service provider to satisfy payment of the amount specified by the electronic payment request.

7. The method of claim 5, further comprising:
before the sale of the portion of the selected one or more securities, performing, with the electronic payment processing system, an electronic transfer of a dollar amount to the seller or service provider to satisfy payment of the amount specified by the electronic payment request.

8. The method of claim 1, wherein the electronic payment request comprises a plurality of payment types, and the method further comprises:
for each of the plurality of payment types, determining, with the electronic payment processing system, a respective proportion of the total amount of the electronic payment request for the payment type;
for each of the plurality of payment types, determining, with the electronic payment processing system, a respective securities account of the selected one or more securities accounts associated with the payment type; and
performing, with the electronic payment processing system, an electronic transfer of a dollar amount to the seller or service provider to satisfy payment of the amount specified by the electronic payment request, wherein the dollar amount comprises a sum of dollar amounts from the respective securities accounts for each of the plurality of payment types in proportion to each of the respective payment types.

9. The method of claim 1, wherein the user interface is configured to display a plurality of representations of the one or more brokerage firms.

10. A method for operating an electronic payment processing system that permits a donor to donate to a donee using one or more securities in one or more securities accounts associated with the donor and maintained by one or more brokerage firms, the method comprising:
receiving, with the electronic payment processing system, data indicating an electronic payment request for the donor to pay an amount for a donation to the donee;
in response to receiving the data indicating the electronic payment request:
accessing, with the electronic payment processing system, a data storage device to identify the one or more securities accounts associated with the donor;
generating a user interface configured, in any order:
to display a first representation of the one or more brokerage firms, and to allow the donor to input a first selection of the displayed first representation of the one or more securities accounts,
to display a second representation of the one or more securities accounts, and to allow the user to input a second selection of the displayed second representation of the one or more securities accounts associated with the one or more brokerage firms, and to display a third representation of the one or more securities, and to allow the donor to input a third selection of the displayed third representation of the one or more securities associated with the one or more securities accounts;

receiving data indicating:
the first selection of the selected one or more brokerage firms,
the second selection of the selected one or more securities accounts, and
the third selection of the selected one or more securities, by the donor on the user interface;

determining, with the electronic payment processing system, that the selected one or more securities have a sufficient value to satisfy the amount specified by the electronic payment request; and in response to a determination that the selected one or more securities have a sufficient value to satisfy the amount specified by the electronic payment request, generating, with the electronic payment processing system, one or more first electronic messages that direct a transfer or sale of at least a portion of the selected one or more securities from the selected one or more securities accounts to a receiving securities account to satisfy the amount specified by the electronic payment request.

11. The method of claim 10, further comprising:
responsive to receiving the one or more first electronic messages, retitling, with the electronic payment processing system, the selected one or more securities of the donor to the donee.

12. The method of claim 10, wherein:
the user interface is configured to display a plurality of representations of the one or more brokerage firms.

13. A method for operating a computing device connected to an electronic payment processing system that permits a user to purchase or lease a good or service using one or more securities in one or more securities accounts associated with the user and maintained by one or more brokerage firms, the method comprising:
outputting, by the computing device and for display, a user interface configured, in any order:
to display a first representation of the one or more brokerage firms, and to allow the user to input a first selection of the displayed first representation of the one or more securities accounts;
to display a second representation of the one or more securities accounts, and to allow the user to input a second selection of the displayed second representation of the one or more securities accounts associated with the one or more brokerage firms; and
to display a third representation of the one or more securities, and to allow the user to input a third selection of the displayed third representation of the one or more securities associated with the one or more securities accounts;
receiving, by the computing device, and from the user via the user interface, information indicating:
the first selection of the selected one or more brokerage firms,
the second selection of the selected one or more securities accounts,
the third selection of the selected one or more securities, and
a fourth selection of a payment for a purchase or lease of the good or service from the seller or service provider;

generating, by the computing device, one or more second electronic messages that comprise data indicating the first selection of the selected one or more brokerage firms, the second selection of the selected one or more securities accounts, the third selection of the selected one or more securities, and the fourth selection of the payment; and
sending, by the computing device and to the electronic payment processing system, the one or more second electronic messages.

14. The method of claim 13, further comprising:
receiving, by the computing device, and from the user via the user interface, information comprising a fifth selection of the seller or service provider of the good or service to receive the payment; and
including, by the computing device, the information indicating the fifth selection in the one or more second electronic messages.

15. The method of claim 13, wherein the user interface comprises a plurality of representations of the one or more brokerage firms.

16. The method of claim 13, further comprising:
receiving, by the computing device and from the electronic payment processing system, a third electronic message comprising information that indicates that the payment for the purchase or lease of the good or service from the seller or service provider has completed; and
in response to receiving the third electronic message, outputting, by the computing device, a notification associated with the information in the third electronic message.

17. An electronic payment processing system that permits a user to purchase or lease a good or service using one or more securities in one or more securities accounts associated with the user and maintained by one or more brokerage firms, comprising:
one or more processors; and
a non-transitory computer-readable medium that has executable code stored thereon, which, when executed by the one or more processors, causes the electronic payment processing system:
to receive data indicating an electronic payment request for the user to pay an amount for a purchase or lease of the good or service from a seller or service provider that is not one of the one or more brokerage firms;
to access a data storage device to identify the one or more securities accounts associated with the user, in response to receiving the data indicating the electronic payment request;
to generate a user interface configured, in any order:
(a) to display a first representation of the one or more brokerage firms, and to allow the user to input a first selection of the displayed first representation of the one or more brokerage firms;
(b) to display a second representation of the one or more securities accounts, and to allow the user to input a second selection of the displayed second representation of the one or more securities accounts associated with the one or more brokerage firms; and
(c) to display a third representation of the one or more securities, and to allow the user to input a third selection of the displayed third representation of the one or more securities associated with the one or more securities accounts;
to receive data indicating:

the first selection of the selected one or more brokerage firms,
the second selection of the selected one or more securities accounts, and
the third selection of the selected one or more securities, by the user on the user interface;
to determine that the selected one or more securities have a sufficient value to satisfy the amount specified by the electronic payment request; and
to generate one or more first electronic messages that direct a transfer or a sale of at least a portion of the selected one or more securities from the selected one or more securities accounts to a receiving securities account to satisfy the amount specified by the electronic payment request, in response to a determination that the selected one or more securities have a sufficient value to satisfy the amount specified by the electronic payment request.

18. An electronic payment processing system that permits a donor to donate to a donee using one or more securities in one or more securities accounts associated with the donor and maintained by one or more brokerage firms, comprising:
one or more processors; and
a non-transitory computer-readable medium that has executable code stored thereon, which, when executed by the one or more processors, causes the electronic payment processing system:
to receive data indicating an electronic payment request for the donor to pay an amount for a donation to the donee;
to access, with the electronic payment processing system, a data storage device to identify the one or more securities accounts associated with the donor, in response to receiving the data indicating the electronic payment request;
to generate a user interface configured, in any order:
(a) to display a first representation of the one or more brokerage firms, and to allow the donor to input a first selection of the displayed first representation of the one or more securities accounts;
(b) to display a second representation of the one or more securities accounts, and to allow the user to input a second selection of the displayed second representation of the one or more securities accounts associated with the one or more brokerage firms; and
(c) to display a third representation of the one or more securities, and to allow the donor to input a third selection of the displayed third representation of the one or more securities associated with the one or more securities accounts;
to receive data indicating:
the first selection of the selected one or more brokerage firms,
the second selection of the selected one or more securities accounts, and
the third selection of the selected one or more securities, by the donor on the user interface;
to determine, with the electronic payment processing system, that the selected one or more securities have a sufficient value to satisfy the amount specified by the electronic payment request; and
to generate, with the electronic payment processing system, one or more first electronic messages that direct a transfer or sale of at least a portion of the selected one or more securities from the selected one or more securities accounts to a receiving securities account to satisfy the amount specified by the electronic payment request, in response to a determination that the selected one or more securities have a sufficient value to satisfy the amount specified by the electronic payment request.

19. A method for operating a computing device connected to an electronic payment processing system that permits a donor to donate to a donee using one or more securities in one or more securities accounts associated with the donor and maintained by one or more brokerage firms, the method comprising:
outputting, by the computing device and for display, a user interface configured, in any order:
to display a first representation of the one or more brokerage firms, and to allow the donor to input a first selection of the displayed first representation of the one or more securities accounts;
to display a second representation of the one or more securities accounts, and to allow the donor to input a second selection of the displayed second representation of the one or more securities accounts associated with the one or more brokerage firms; and
to display a third representation of the one or more securities, and to allow donor to input a third selection of the displayed third representation of the one or more securities associated with the one or more securities accounts;
receiving, by the computing device, and from donor via the user interface, information indicating:
the first selection of the selected one or more brokerage firms,
the second selection of the selected one or more securities accounts,
the third selection of the selected one or more securities, and
a fourth selection of a the transfer of the selected one or more securities as the donation;
generating, by the computing device, one or more second electronic messages that comprise data indicating the first selection of the selected one or more brokerage firms, the second selection of the selected one or more securities accounts, the third selection of the selected one or more securities, and the fourth selection of the transfer; and
sending, by the computing device and to the electronic payment processing system, the one or more second electronic messages.

20. The method of claim 19, further comprising:
receiving, by the computing device, and from the donor via the user interface, information comprising a fifth selection of the donee of the transfer of the selected one or more securities as the donation; and
including, by the computing device, the information indicated the fifth selection in the one or more second electronic messages.

21. The method of claim 19, wherein the user interface comprises a plurality of representations of the one or more brokerage firms.

22. The method of claim 19, further comprising:
receiving, by the computing device and from the electronic payment processing system, a third electronic message comprising information that indicates that the transfer of the selected one or more securities as the donation has completed; and in response to receiving the third electronic message, outputting, by the computing device, a notification associated with the information in the third electronic message.

\* \* \* \* \*